United States Patent

[11] 3,614,765

[72] Inventors George H. Huber Cinnaminson; Eugene I. Gertler, Cinnaminson; Dennis W. Habgood, Magnolia; John A. Ciarrocchi, Magnolia; Walter A. Richman, Woodcrest, all of N.J.

[21] Appl. No. 742,011
[22] Filed July 2, 1968
[23] Division of Ser. No. 542,057, Apr. 12, 1966, Pat. No. 3,416,134
[45] Patented Oct. 19, 1971
[73] Assignee Ultronic Systems Pennsauken, N.J.

[54] QUOTATION BOARD SYSTEM
3 Claims, 38 Drawing Figs.

[52] U.S. Cl. .......... 340/324, 318/664, 340/325

[51] Int. Cl. .......... G09f 11/08, G09f 11/28

[50] Field of Search .......... 318/138, 281, 282, 266, 466, 664; 340/324, 325, 316

[56] References Cited

UNITED STATES PATENTS

| | | | |
|---|---|---|---|
| 2,455,210 | 11/1948 | Anderson | 340/325 |
| 2,617,870 | 11/1952 | Kern | 340/325 |
| 3,111,658 | 11/1963 | Ehrat | 340/325 |

*Primary Examiner*—John W. Caldwell
*Assistant Examiner*—Marshall M. Curtis
*Attorneys*—Norman J. O'Malley and Theodore C. Jay, Jr.

ABSTRACT: A quotation board system for the display of prices of stocks, commodities and the like wherein messages are transferred from a central location to individual quotation board locations. Different stocks can be selected at each location for display using manually changeable stock identification characters and individual digit units for displaying prices.

| CONDITION | N1 | N3 | N2 | N4 | SAA | SAB |
|---|---|---|---|---|---|---|
| \|MN\| = \|DN\| | +.5 | +.5 | 0 | 0 | +6.3 | -6.3 |
| \|MN\| < \|DN\| | +.5 | -.5 | 0 | -6.0 | +6.3 | 0 |
| \|MN\| > \|DN\| | -.5 | +.5 | -6.0 | 0 | 0 | -6.3 |

EQUATIONS — DIRECTION

1. |MN| - |DN| = +
   a. |MN| -6.3 - |DN| = + UP (DR2 = -6V)
   b. " " " = - DOWN (DR2 = 0V)
2. |MN| - |DN| = -
   a. |MN| +6.3 - |DN| = + UP
   b. " " " = - DOWN
3. |MN| = |DN| NULL (N2=N4=0)

QUOTATION BOARD SYSTEM

CROSS-REFERENCES TO RELATED APPLICATIONS

This application is a division of pending application Ser. No. 542,057 filed Apr. 12, 1966 now U.S. Pat. No. 3,416,134.

BACKGROUND OF THE INVENTION

Quotation board systems are in use which display one or more price categories of stocks, bonds, commodities, warrants, etc. so that brokers and their customers may be kept informed. For convenience only the term "stocks" will usually be used hereinafter, and it will be understood to include these various kinds of property. Some quotation boards provide only current or last price, whereas others provide several price categories such as Close, Open, High, Low, Last, etc.

For greatest usefulness such systems should be capable of rapid updating in a reliable manner, and should be as economical as possible in order to attain widespread use. Further, inasmuch as different brokers may have different primary interests, and such interests may change from time to time, flexible system capable of convenient change of stocks displayed is highly desirable.

The present invention is designed to provide an improved system for accomplishing these objectives.

SUMMARY OF THE INVENTION

In the system of the invention, messages are transmitted from a central location via suitable communication lines to the quotation board locations. Each message has a coded stock identification section, a coded price category identification section and a coded price section. Also, a recognizable initial sync pattern and a parity section are advantageously provided to permit eliminating messages which have been transmitted improperly or have become altered in transit.

Commonly the messages cover many more stocks and price categories than are likely to be used at any one quotation board installation. Provision is made at each installation to select from the train of messages those stock quotations which can be used at that installation. Provision is also made for enabling a broker to change the stocks displayed on his quotation board in a simple, very convenient manner. This is accomplished by providing manually changeable stock identification characters for each board location, with associated means for simultaneously changing the coding combinations which recognize the stock messages to be displayed at that location.

In so-called Full Range boards wherein several price categories are displayed for a given stock, all price category sections are enabled upon the recognition of the stock identification in the message for that location. The price category identification in the message enables the category section at all stock locations where prices correspond thereto. Thus the selection of the particular stocks is obtained by a joint enabling operation. Then, the displayed price at the selected location or locations is changed if it differs from the message price.

To display the prices, individual digit units are provided at each price location. In the specific embodiment a moveable digit member in the form of an endless belt is driven by a respective motor until the proper digit is displayed, and a detent mechanism insures accurate positioning. To reduce the positioning time, it is desirable to drive the motor in the direction of the shorter path from old to new positions. This is accomplished by developing an analog voltage varying with the displayed digit, converting the desired new digit in the message from digital to analog form, and using special circuits to determine the direction of motor rotation and arrival at the desired new position.

To increase the speed of updating, particularly at the beginning of a day when a rapid sequence of messages would be required to update all categories of a Full Range board, a New High–New Low computer is provided at the board location for determining these prices from a Last Sale message and the then-existing High and Low prices on the board. This markedly reduces the number of messages which must be processed, while still yielding the desired information.

To further reduce the time required for processing messages, those which are not useable at a particular board installation are quickly discarded so that only potentially useable messages are completely processed. Thus the absence of a stock on the board corresponding to a message is used to discard the message. Advantageously this is accomplished by utilizing the nonenabling of the Last price position on the Board.

Figure 5A:
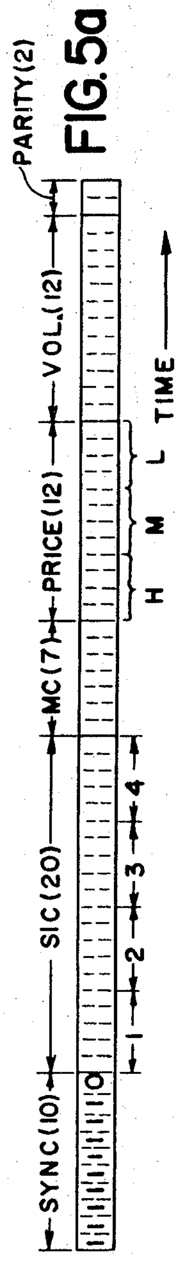
Figure 5B:
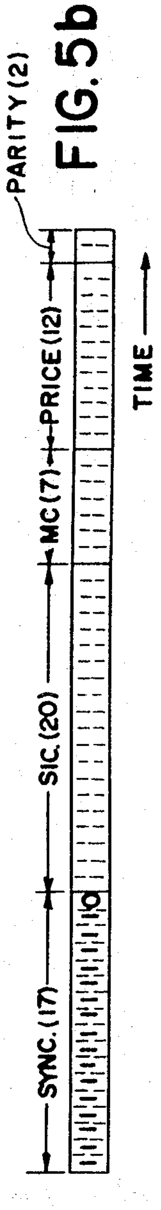
Figure 6:
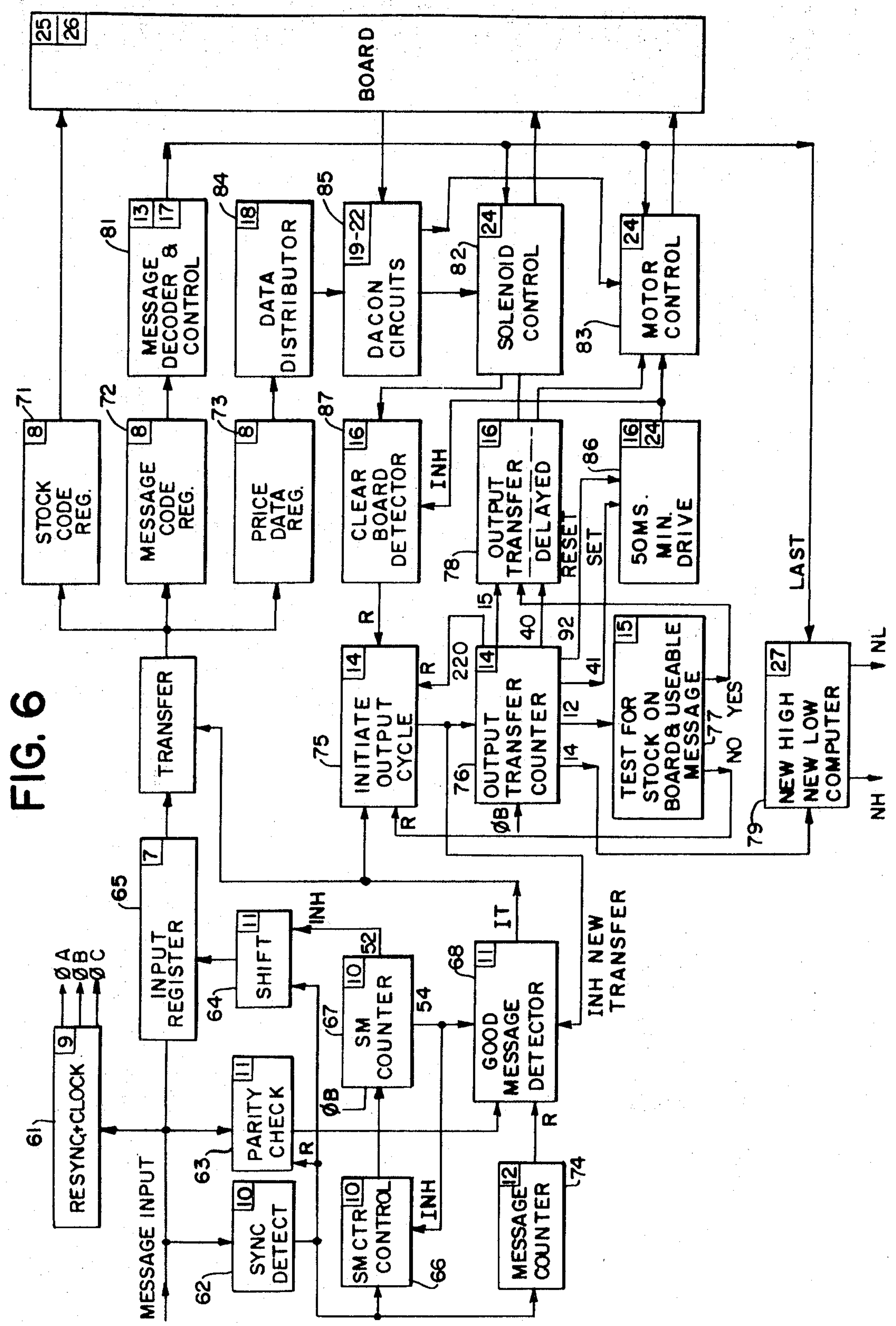
Figures 7, 8A, 8B, 8C, 8D:
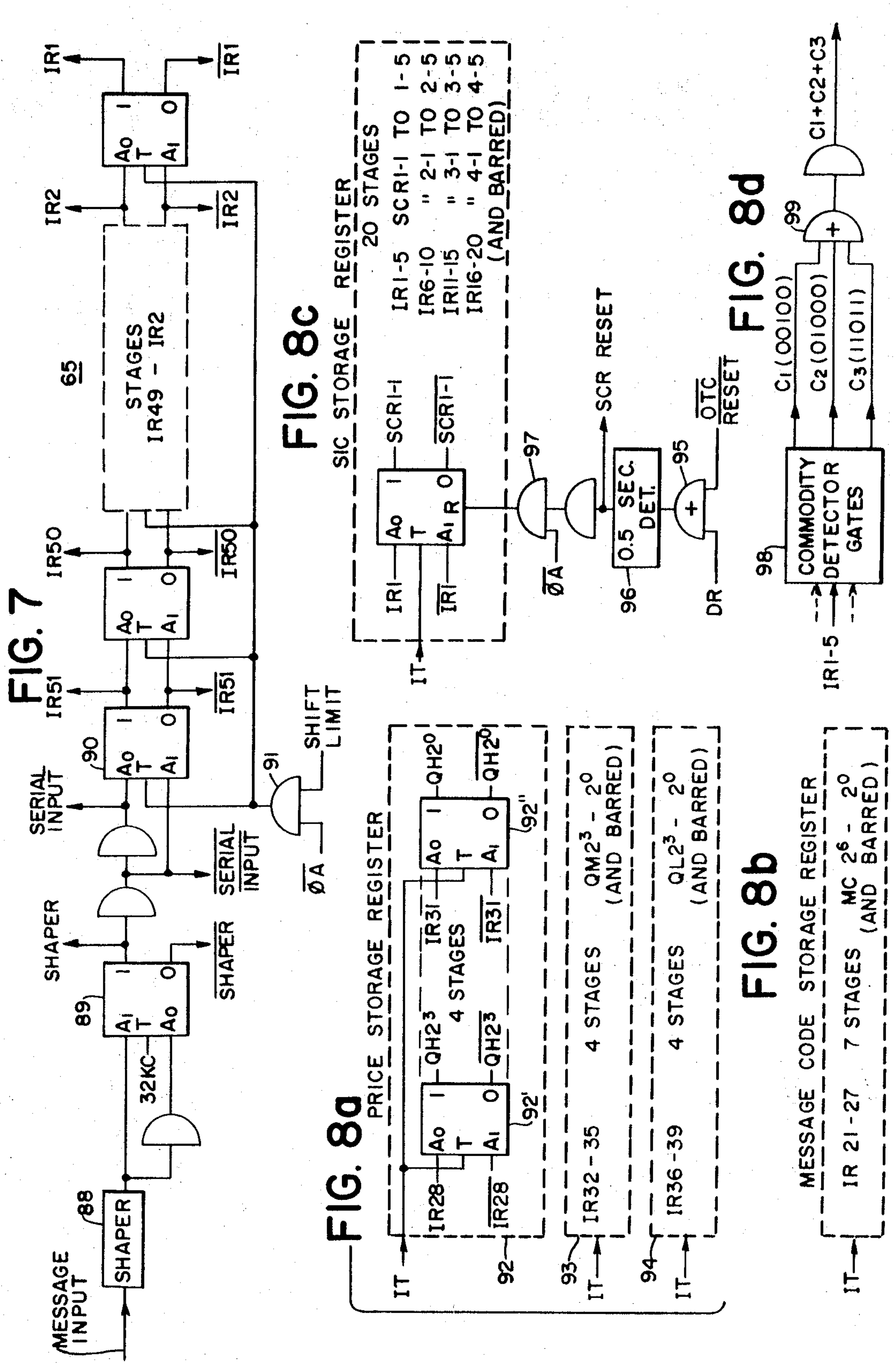
Figure 9:
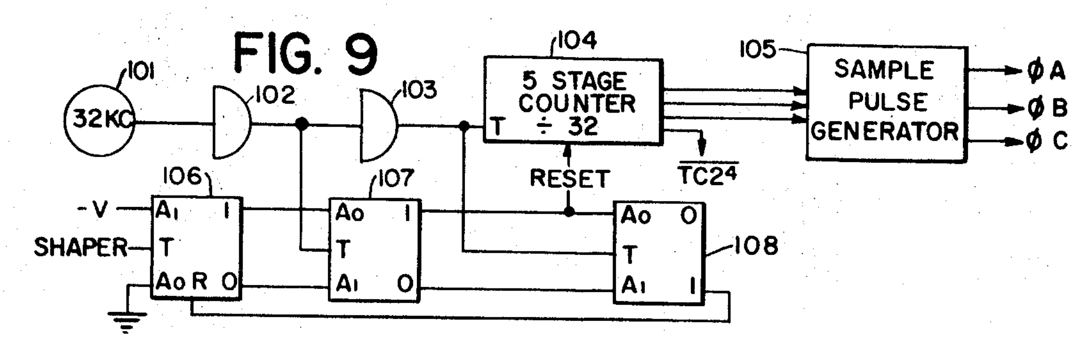
Figures 10, 11:
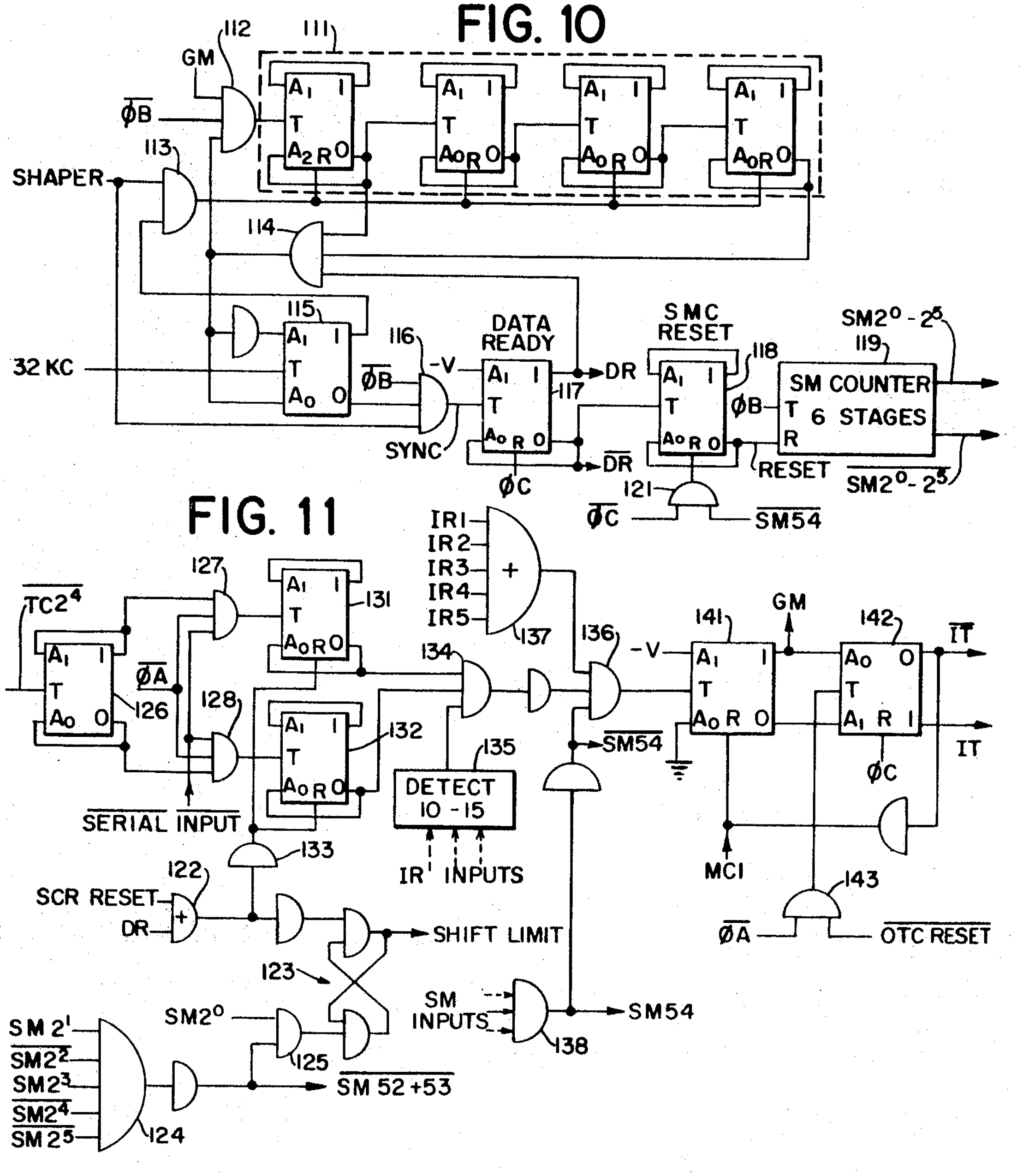
Figure 9A:
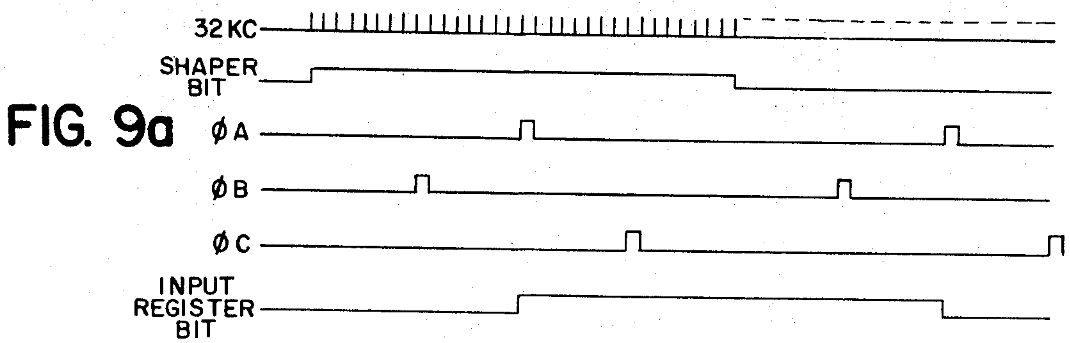
Figures 12, 13, 14:
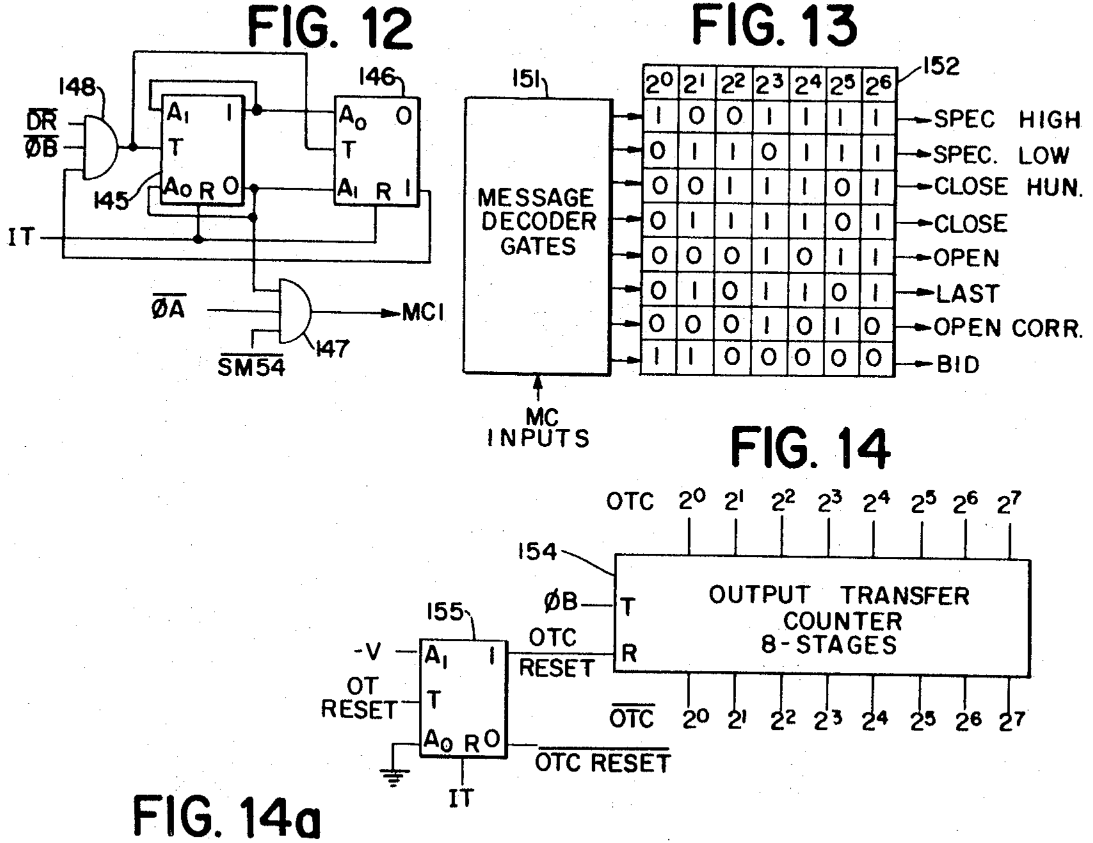

FIGS. 5*a* and 5*b* show two message formats;

FIG. 6 is an overall block diagram of the system;

FIGS. 7–25 show circuits for performing the functions indicated in the block diagram of FIG. 6 and may be generally designated as follows:

FIG. 7—Input Register;

FIGS. 8*a*, *b*, *c*, *d*—Price, Message, SIC Storage Registers; Commodity Detectors;

FIGS. 9, 9*a*—Resynchronizer and Clock, and waveforms;

FIG. 10—Sync Detector, SM Counter and Control;

FIG. 11—Parity Check; Good Message Detector; Input Shift control; Input Transfer Control;

FIG. 12—Message Counter

FIG. 13—Message Decoder

Figure 14A:
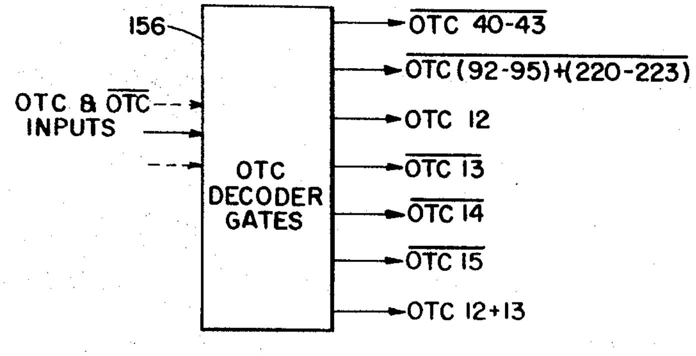
Figures 15, 16:
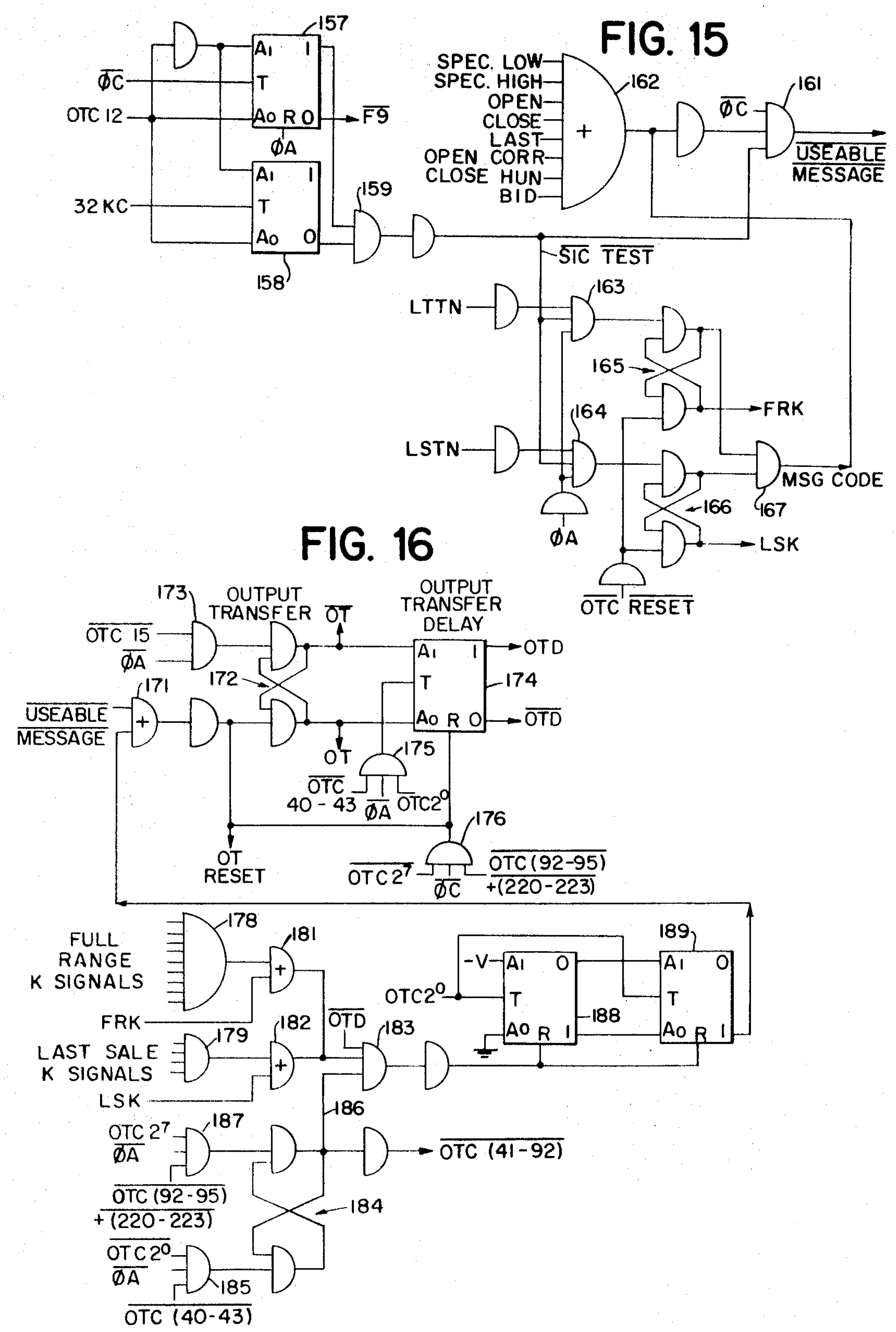
Figure 18:
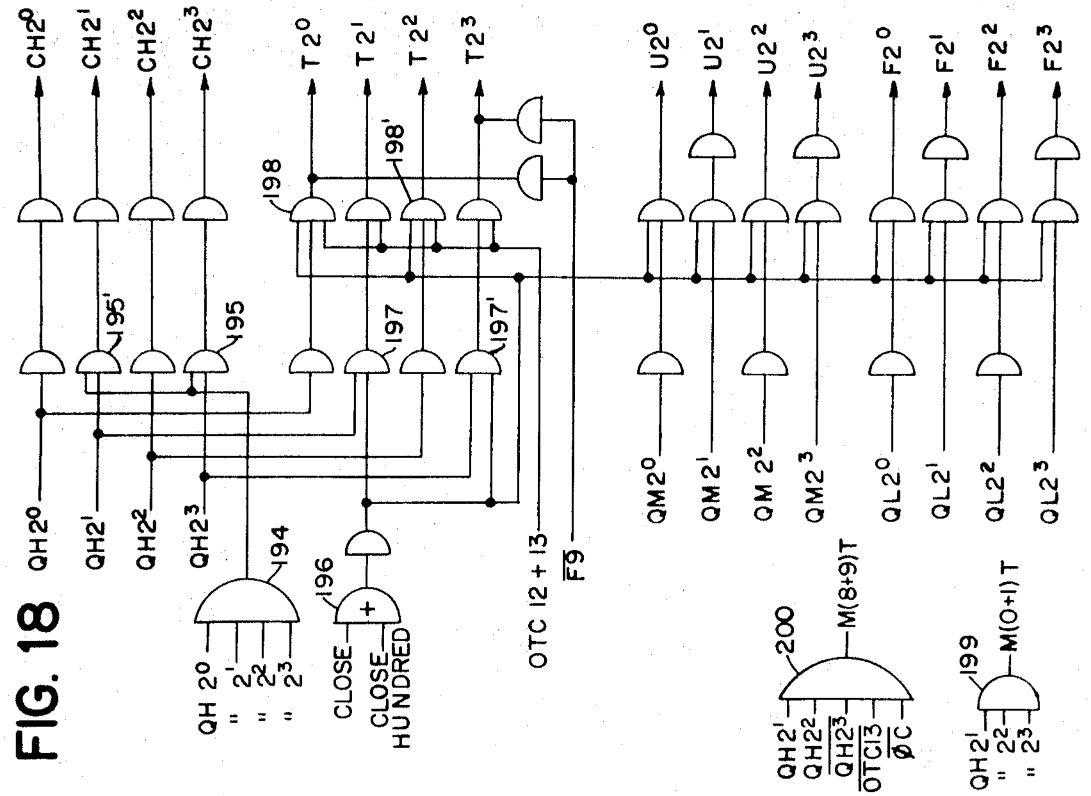
Figure 17:
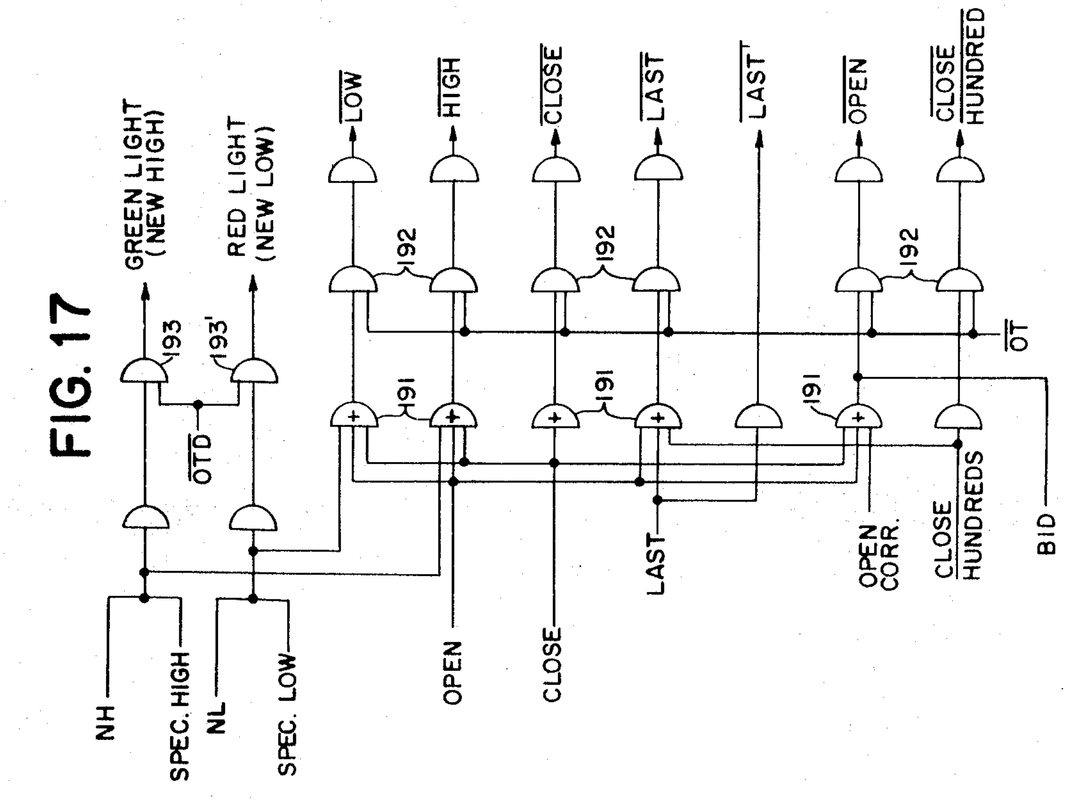
Figure 19:
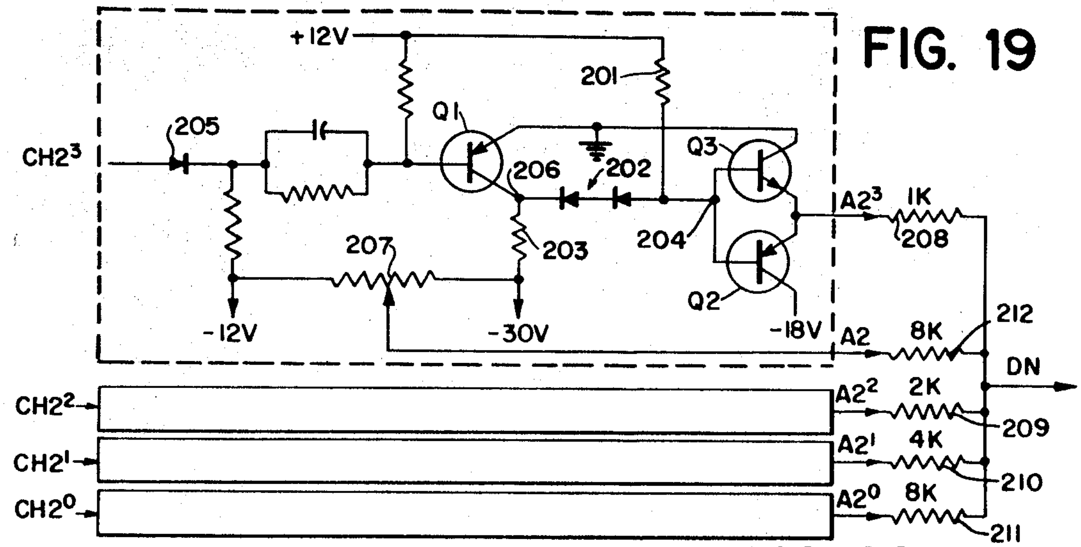
Figures 19A, 20, 24:
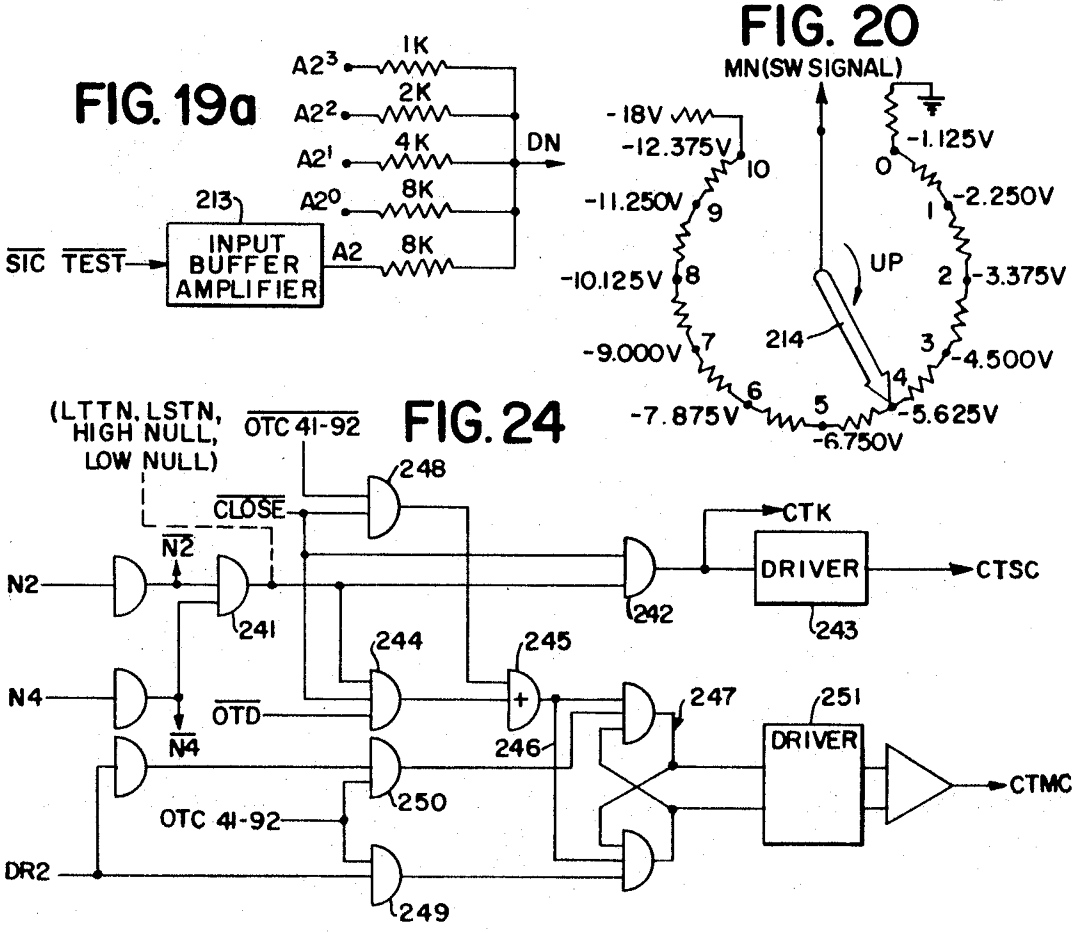
Figure 21:
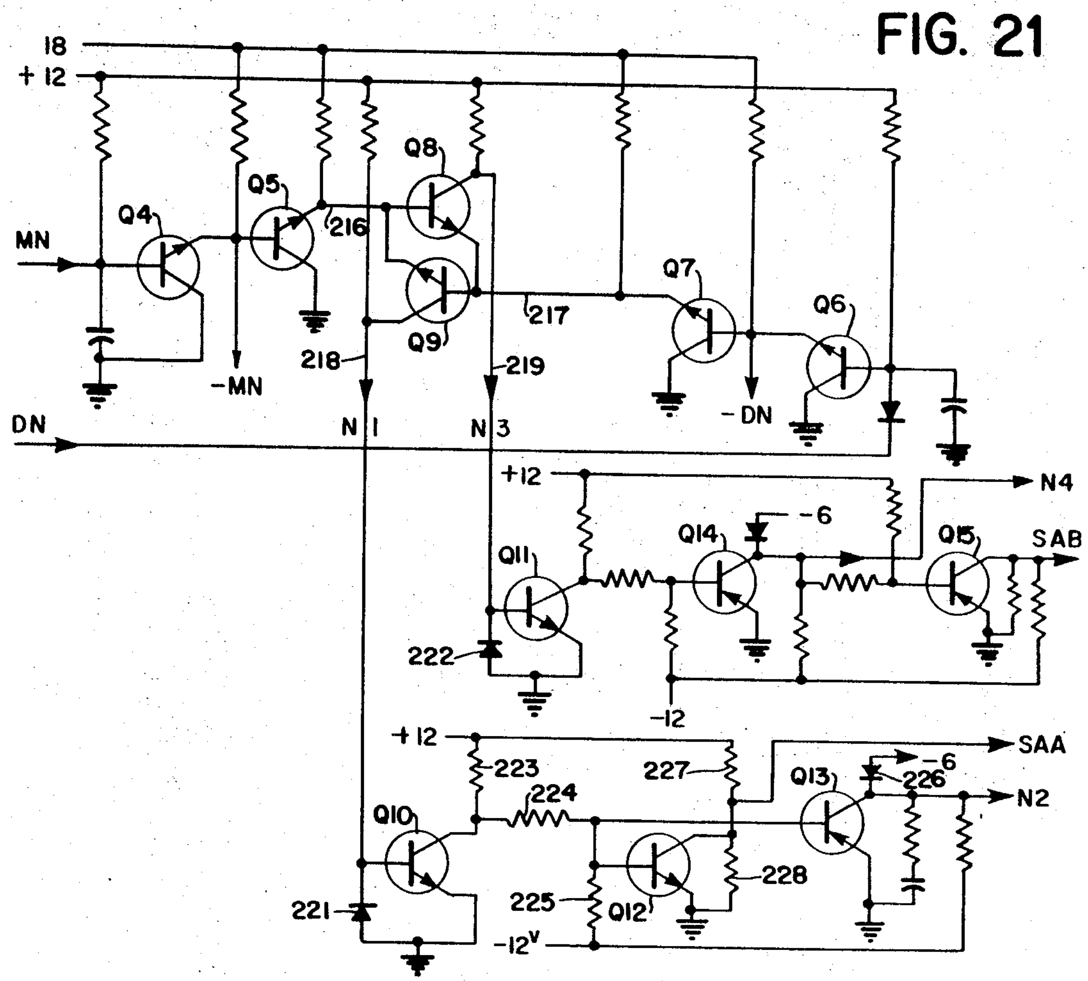
Figure 22:
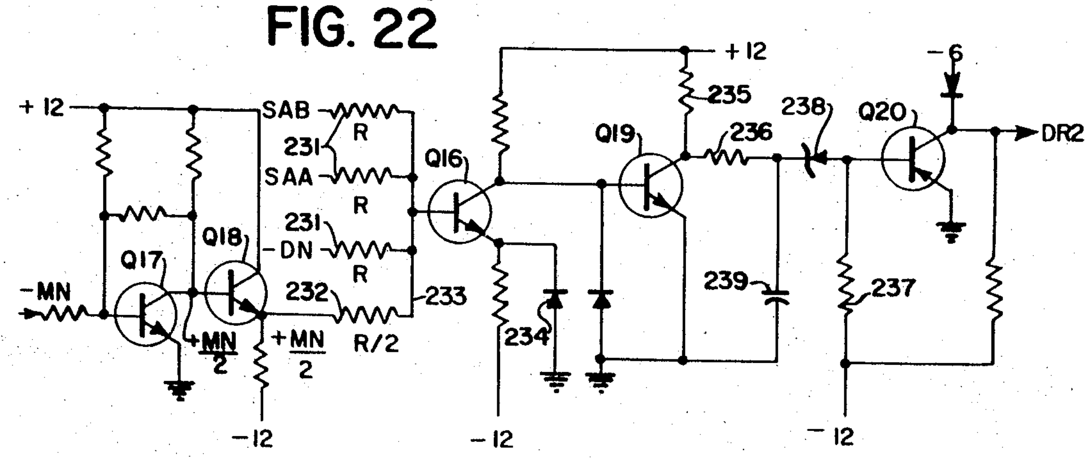
Figures 23, 27:
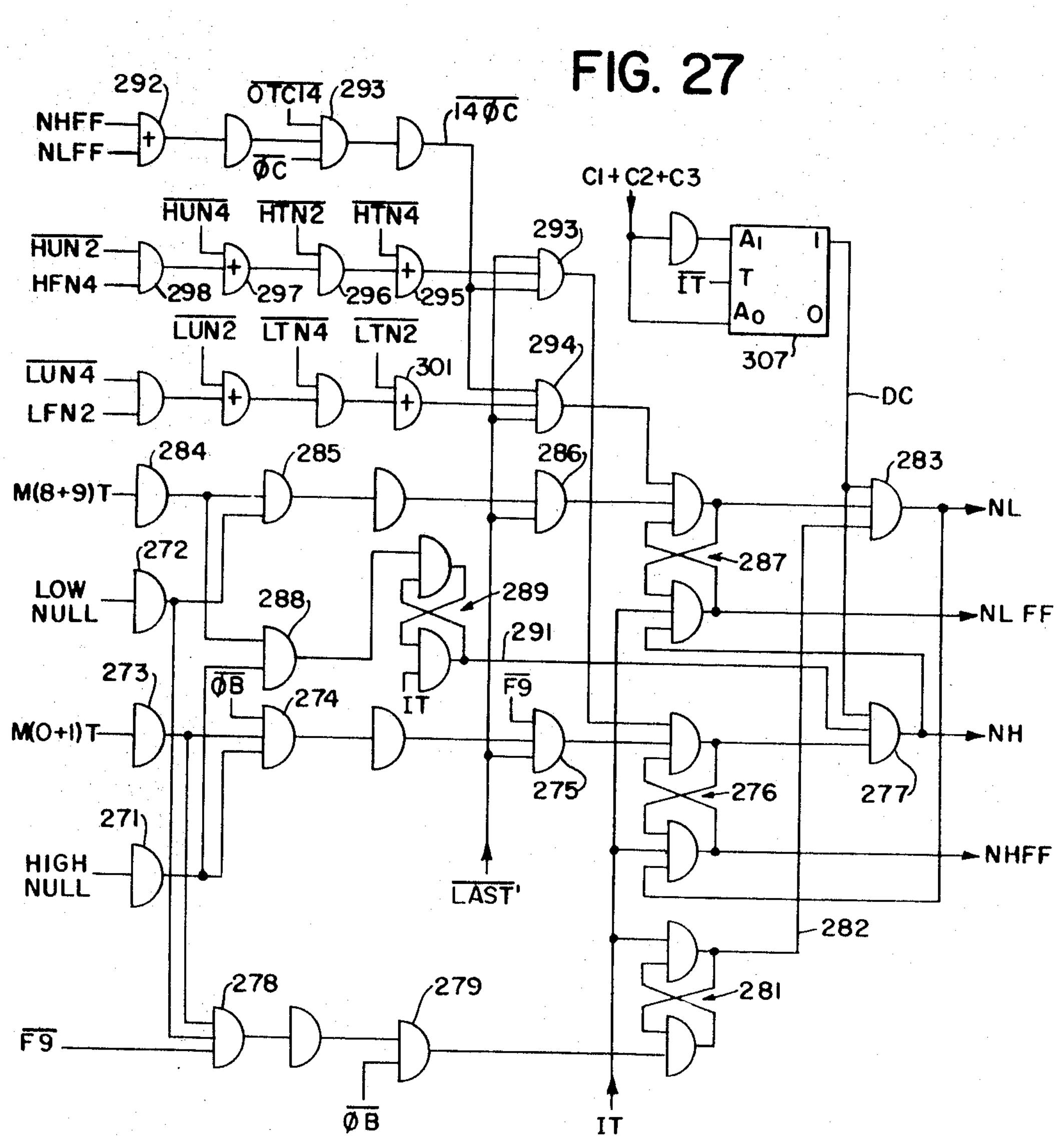
Figure 25:
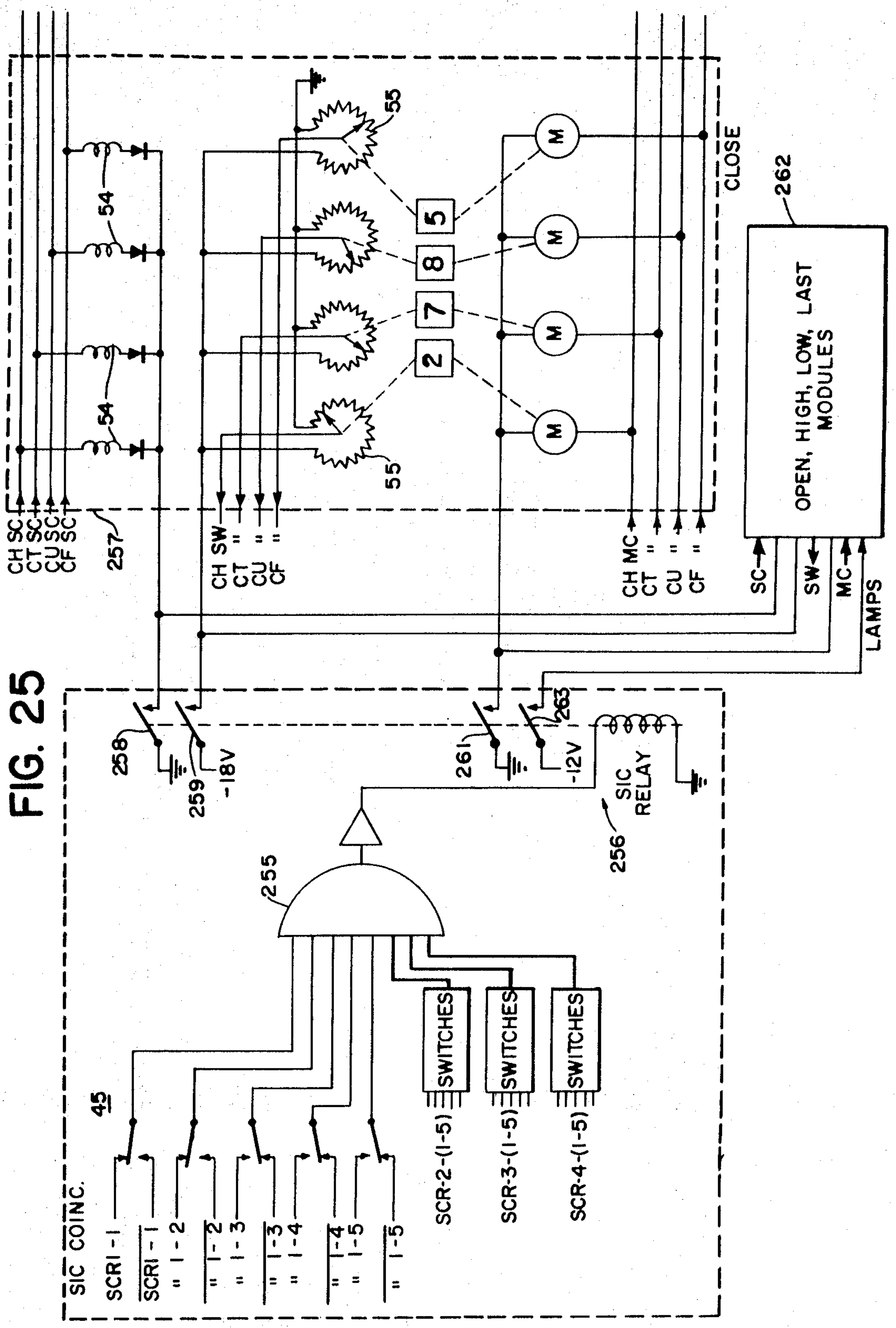
Figure 26A:
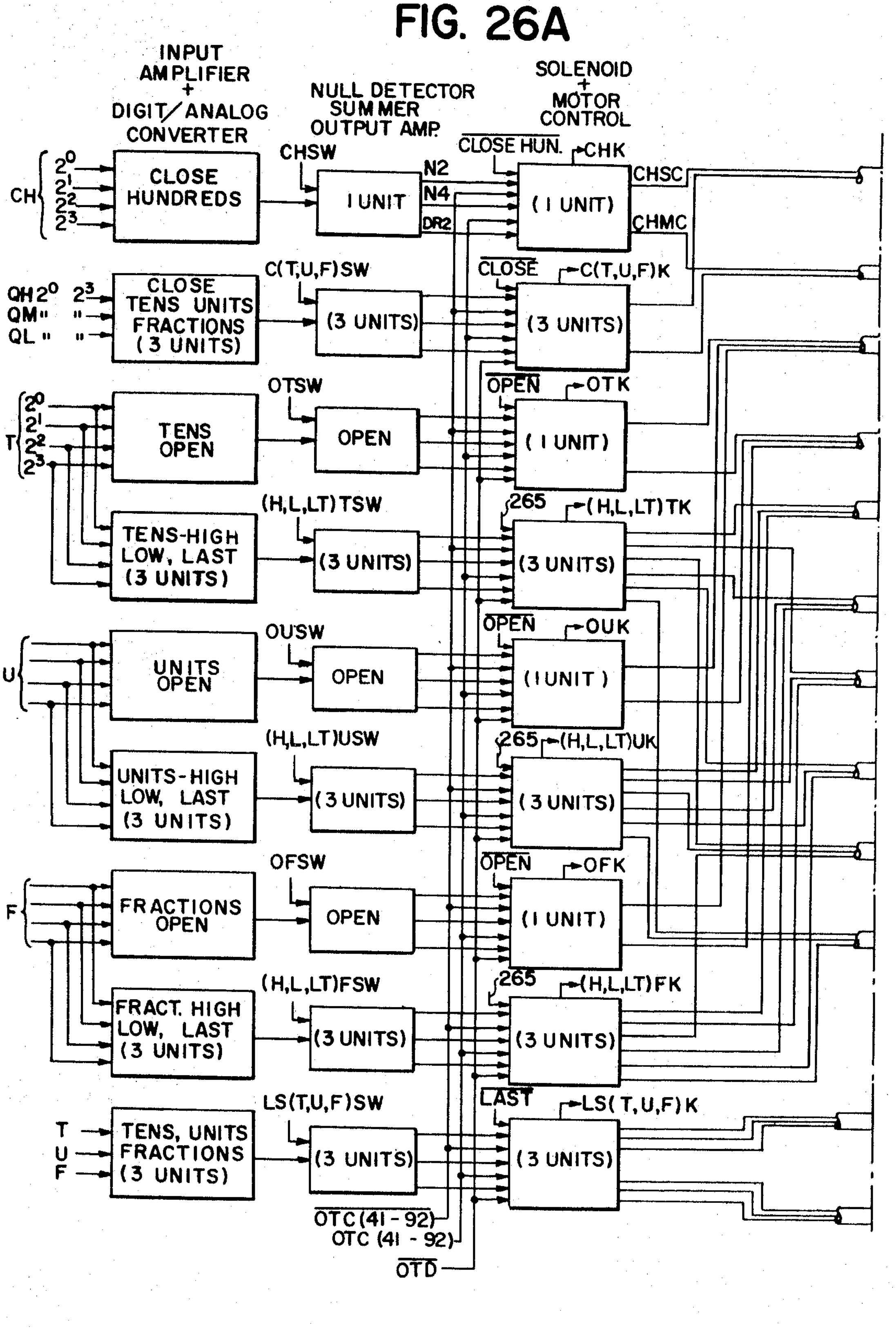
Figure 26B:
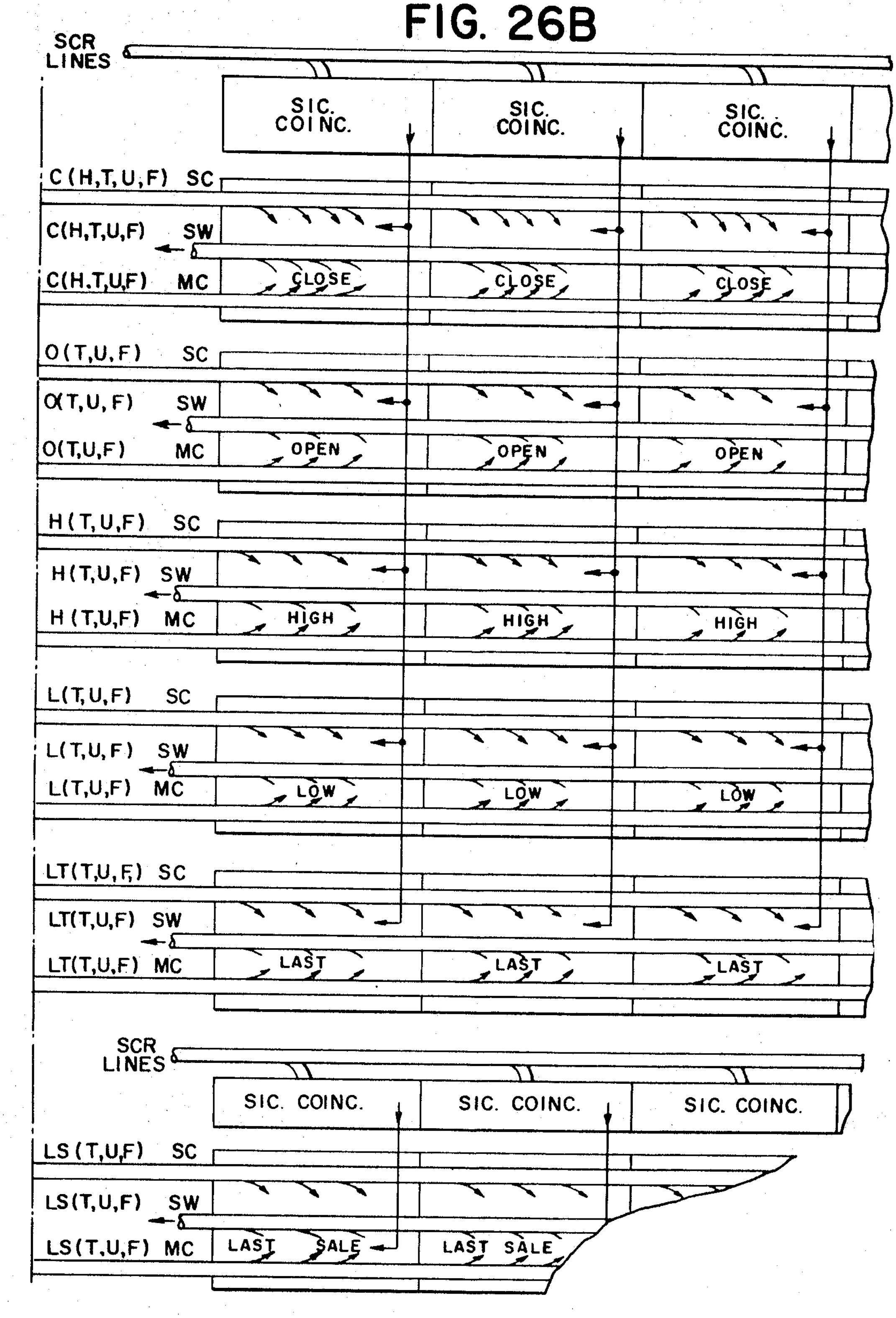

FIGS. 14, 14*a*—Output Transfer Counter and decoder;

FIG. 15—SIC Test and Useable Message Detector;

FIG. 16—Output Transfer Control; Clear Board; Detector;

FIG. 17—Message Control;

FIG. 18—Data Distributor;

FIGS. 19, 19*a*—Dacon Input circuits;

FIG. 20—Dacon submodule circuit;

FIG. 21—Dacon null detector;

FIG. 22—Dacon direction detector;

FIG. 23—Dacon operating equations;

FIG. 24—Solenoid and Motor control;

FIG. 25—Board Module control;

FIGS. 26A and 26B show the manner in which assemblies of the units of FIGS. 19–25 are connected to change the prices on the Full Range and Last Sale boards;

FIG. 27 shows the new High-New Low computer; and

Figure 28A:
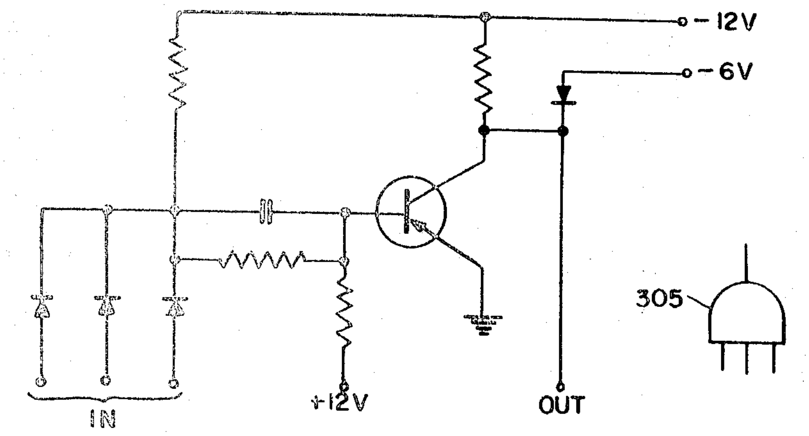

FIGS. 28*a*, *b* show gate and flip-flop modules widely used in the detailed circuits.

Figure 1:
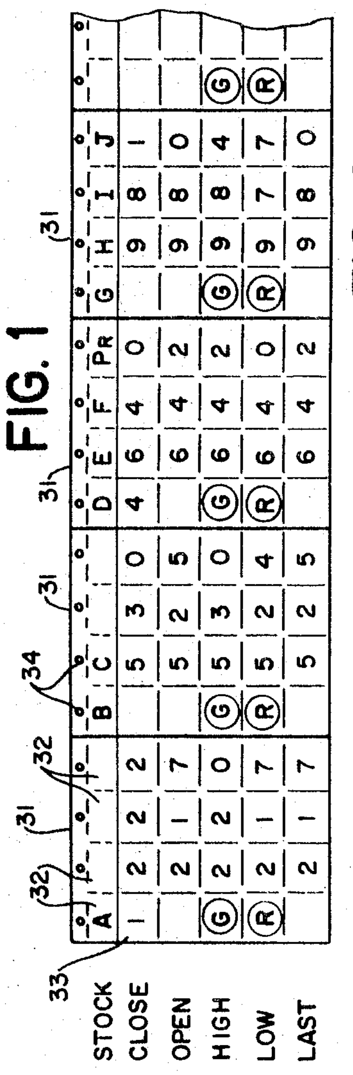
FIGS. 1 and 2 show face views of Full Range and Last Sale quotation boards, respectively.

Referring to FIG. 1, a portion of a Full Range board having a desired number of stock locations 31 is shown. At the top of each location are four alpha submodules 32 which display the letters of the stock whose prices are given below. Four numeric submodules 33 are in the row designated Close at each location, and give hundreds, tens, units and fractions of that price. The rows designated Open, High, Low and Last each contain three numeric submodules for corresponding prices, the hundreds digit being omitted as unnecessary. Green and red lamps G, R light up when a new high or new low is received. The fractions numerals are of distinctive color such as orange, for ready identification. The letters in the Stock row may be changed by the stockbroker by inserting a key in holes 34, so that any desired stock may be selected for display. Changing the letters automatically causes the prices of the newly selected stock to be displayed the next time the new stock information is received.

Figure 2:
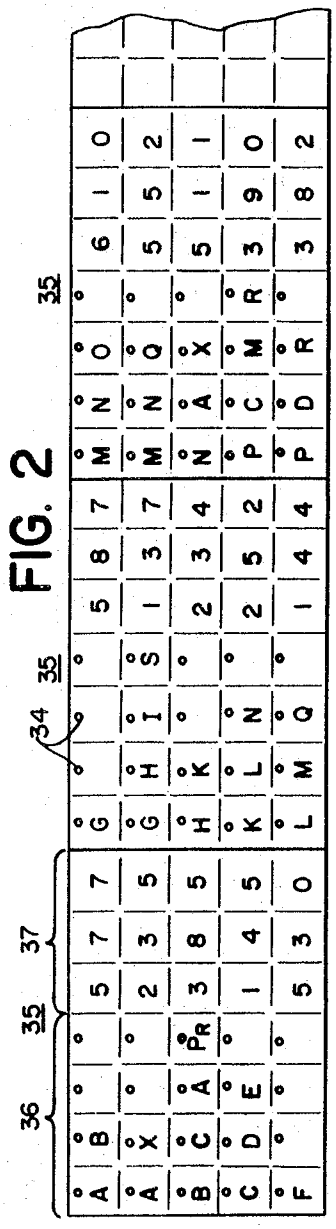

FIG. 2 shows a portion of a Last Sale board having locations 35. At each location the Last price of five different stocks are displayed in corresponding rows. The first four columns 36 display the letters of the selected stocks. The last three columns 37 display the corresponding Last prices in tens, units and fractions. Hundreds are omitted as unnecessary, since the broker will be aware of the appropriate price.

Figures 3, 4, 4A:
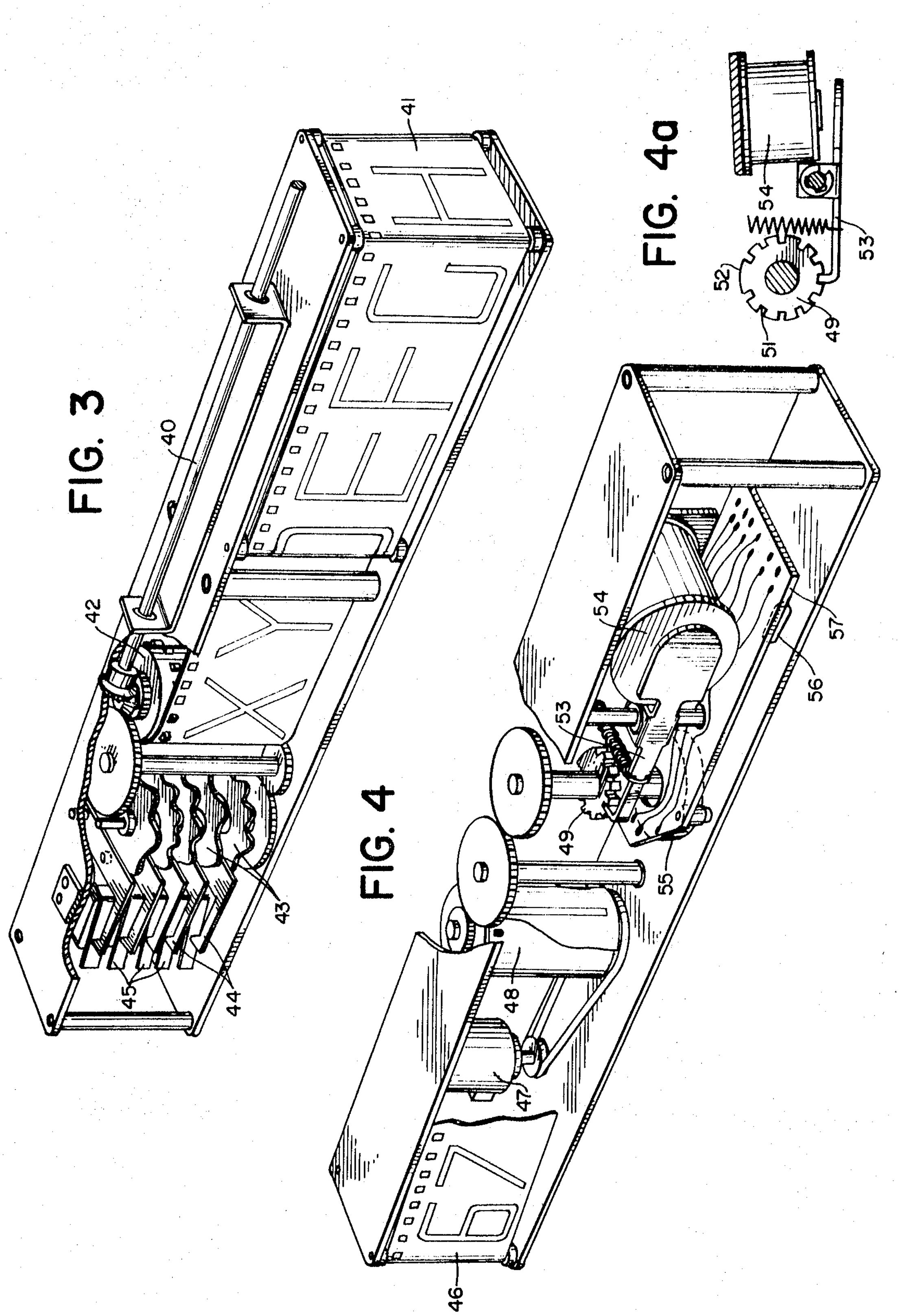
FIGS. 3 and 4 are perspective views of alpha and numeric submodules, respectively.
FIG. 4*a* is a detail of the latter.

FIG. 3 shows an alpha submodule. An endless belt 41 carries letters A to Z and a blank. The leftmost submodule may also have C1, C2, C3 for commodities and the other three may have Pr for Preferred. The belt has sprocket holes engaging sprocket drum 42 which is manually rotatable by shaft 40 through bevel gears. The front end of the shaft is slotted to receive a key through a hole in the panel. Drum 42 is geared to an assembly of five cams 43 which engage respective levers 44 to actuate microswitches 45. Cams 43 are coded to actuate the microswitches in different coding combinations as different letters are brought into view at the front of the submodule.

FIG. 4 shows a numeric submodule. Digits 0–9 are carried by endless belt 46 driven by a reversible DC motor 47 through a belt drive to sprocket drum 48. The drum is geared to a detent wheel 49 which rotates once for a full traversal of belt 46. Wheel 49 has 11 slots 51 spaced at one-twelfth revolution, with a blank 52 for the position 12. Detent arm 53 is spring biased into the slots, and withdrawn therefrom by solenoid 54. The arm of a 12-position rotary switch 55 is driven with the detent wheel. The switch contacts are connected to resistors, one of which is shown at 56, mounted on a printed circuit board 57. These resistors are connected in a ring configuration as explained later for FIG. 20.

In operation, the settings of the microswitches 45 in the alpha submodules at a given location recognize the SIC (Stock Identification Code) in a message and enable circuits for the solenoids and motors corresponding thereto. The position of rotary switch 55 is used to indicate the numeral (MN) then being displayed, and if it differs from the desired numeral (DN) the solenoid and motor are energized to move belt 46 until the desired numeral is displayed. Detent arm 53 and wheel 49 stop movement of belt 46 precisely at the desired position, and motor 47 is deenergized. This will be explained in detail later.

FIG. 5A shows one type of message used to supply information to the quotation system of the present invention. The message format is like that described in application Ser. No. 261,530, filed Feb. 27, 1963, now U.S. Pat. No. 3,310,782 by Sinn et al. for DATA MESSAGE SYSTEM. In that application the messages are transmitted from a master station to slave stations distributed around the country to update memories thereat. Here, the messages are used for display purposes.

The message starts with an identifying sync pattern specifically shown as nine 1 bits followed by a 0 bit. This is followed by a 20-bit SIC section which accommodates four 5-bit sections for four alpha characters. The coding of the cams 43 in FIG. 3 agrees with the SIC message coding. A 7-bit message code section MC serves to identify the category of the message (Close, Open, High, etc.). This is followed by a 12-bit Price section sufficient for three BCD (Binary Coded Decimal) digits denoted H, M, L for High, Medium and Low. Throughout the day, when hundreds are not normally transmitted, these correspond to tens, units and fractions. To transmit hundreds, a special code is inserted in the MC section and the coded digit placed in the H position of the Price section. The Volume section is not at present used for this quotation system. The message ends with a 2-bit parity section which gives odd parity for both odd and even bits in the message. In normal updating of a slave station, a given message is repeated after a brief interval, and this is taken into account in the system of the invention.

FIG. 5B shows an alternate message format used for transmissions intended specifically for quotation board use. Here the sync section is longer, specifically shown as 16 1-bits followed by a 0-bit. The volume section of FIG. 5A is omitted, and the other sections are the same. In practice, the quotation system is designed to use either type of message by suitable switching. To avoid undue complexity, the embodiment described hereinafter is shown for the format of FIG. 5A, and modifications for that of FIG. 5B will be briefly mentioned.

FIG. 6 is a block diagram of the system intended to give an overall idea of its functioning. Many interconnections and some particular features have been omitted for simplicity, but will be described later in connection with the detailed circuitry. The numbers in the upper right-hand corners give the figures where the circuits are shown.

The input message is supplied to a Resync and Clock block 61 which develops 0A, 0B and 0C signals used extensively to maintain proper synchronization. At present, message bits occur at the rate of 1KC (kilocycles per second), and the 0 signals occur at that rate but at different phases within a bit interval. The message is supplied to Sync Detector 62, and if the initial sync section is satisfactory, the Parity Check circuit 63 is enabled to check the remainder of the message. Also Shift circuit 64 is enabled to start shifting the SIC and subsequent portions of the message into the Input Register 65. The Sync Detector enables the SM counter Control 66 which in turn allows SM Counter 67 to start counting 0B pulses at a 1KC rate. This counter controls operations prior to use of the message for updating.

The Input Register has 51 stages to accommodate the bits of the message following Sync, but excluding Parity. At a count of 52, SHIFT 64 is inhibited so that no more bits enter the Input Register. At a count of 54, the parity check has been completed and, if correct, Good Message Detector 68 is enabled to develop an IT (Input Transfer) signal which transfers the contents of the Input Register to Stock Code, Message Code and Price Data storage registers 71, 72, 73, ready for use. Message Counter 74 insures that the system will operate on only one of two successive duplicate messages.

The output cycle for using the stored informa tion is initiated in 75 by IT, and Output Transfer Counter 76 is released to start counting 0B pulses. Block 75 also inhibits block 68 from transferring a new message until the existing message has been processed.

The board is first tested in 77 at a count of 12 to ascertain whether the stock of the message is on the board, and if the message category is useable. If "no," block 75 is reset, the inhibition on 68 is removed so that a new message can be processed, and counter 76 is reset. If "yes," transfer by Output Transfer 78 begins at a count of 15. In the meantime, at a count of 14 if the message is a Last price, a new New High or New Low is determined in 79.

Upon storage therein, the SIC from register 71 is supplied to all SIC sections of the quotation board and, if agreement is found in any section (stock on the board), the solenoids and motors in the corresponding price sections are enabled, as mentioned above. The message code in 72 is decoded in 81 and supplied to Solenoid Control 82 and Motor Control 83 so that control signals will be developed for only the proper price categories. The price data in 73 is rearranged and distributed by 84 to Dacon (Digital to Analog Converter) circuits 85, along with present position signals from the module rotary switches. The Dacon circuits determine which, if any, numeric submodules need to be changed and provide appropriate signals to Solenoid Control 82 and Motor Control 83. The latter supply signals to the proper submodules on the board to effect the required changes. The solenoid is actuated first, at a count of 15, to withdraw the detent arm, and the motor is actuated at a count of 40. For changes of one or two digits, the motor may not reach full speed before its energization is removed, and may stop short of the proper detent position. Minimum Drive 86 keeps the motor energized to at least a count of 92, thereby giving a 50-millisecond minimum drive signal.

When the numeric changes have been completed, signals from Solenoid Control 82 actuate Clear Board Detector 87 to reset block 75 and terminate the output cycle. Detector 87 is inhibited by block 86 so that it cannot operate until the minimum drive period is over.

The circuit diagrams shown in subsequent figures use digital logic elements. Many types of elements are known in the art and may be used as desired to perform the functions hereinafter described. The specific embodiment here shown uses NOR-logic units, examples of which are shown in FIG. 28. These will be described at this point to facilitate understanding the circuit diagrams.

FIG. 27*a* shows a NOR circuit of known configuration which need not be described in detail. If any one of the three input lines designated IN is at ground potential, say corresponding to a binary 1, the transistor will be cut off and the output line designated OUT will be negative (binary 0). If all inputs are negative, the transistor will conduct and the output will be at ground potential. For convenience, negative and ground potentials will usually be referred to hereinafter as "low" and "high," respectively. Thus the circuit functions as an AND gate with polarity inversion for input signals whose assertion levels are low, and as an OR circuit with inversion for signals whose assertion levels are high. The symbol 305 is used in the drawings. If only one input line is used, and the others left unconnected, the circuit functions as a polarity inverter.

Figure 28B:
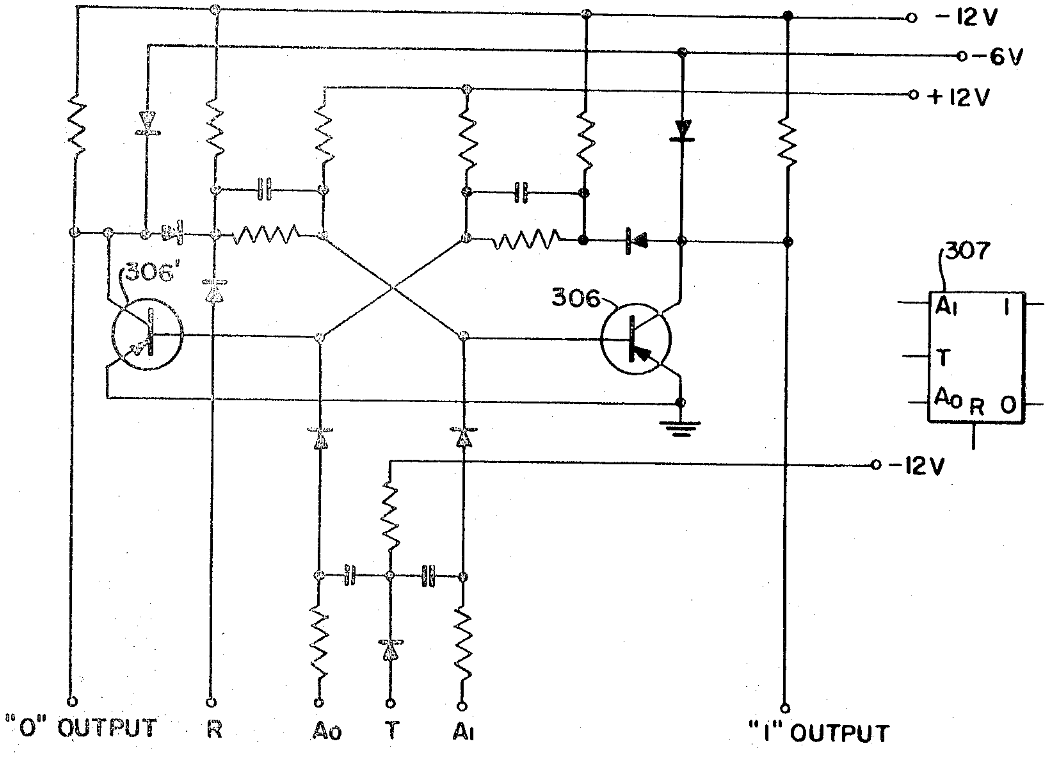

FIG. 28*b* shows a bistable multivibrator or flip-flop circuit, also of known configuration. The circuit of transistor 306 may be considered the 1-side and that of 306' the 0-side. When 306 is conducting the "1" output is high (ground) and when 306' is conducting the "0" output is high. The reset input R is arranged so that, when it goes high, it cuts off 306. By the cross-connections, 306' is turned on. Thus in the reset state the "0" output is high and the "1" output low. In the set state the conditions are reversed. The flip-flop may be switched from one state to the other by a pulse applied to trigger input T, under the control of steering inputs $A_0$ and $A_1$. If $A_0$ is high and $A_1$ low, a positive-going trigger pulse at T will cut off transistor 306', thus turning on 306 and producing the set state wherein the "1" output is high. With the input voltages to $A_0$ and $A_1$ reversed, the trigger pulse will cut off transistor 306, thus turning on 306' and producing the reset state wherein the "0" output is high. Symbol 307 is commonly used in the drawings, and is referred to as "FF."

In the detailed drawings a large number of signals are used. Frequently, some signals used in earlier figures are generated in later figures, and this will be mentioned. Many signals are shown both unbarred and barred in the drawings, e.g. SHAPER and $\overline{\text{SHAPER}}$. One is the inverse of the other, and is developed by an inverter, from opposite outputs of a flip-flop, etc. As used, an unbarred signal usually means that its assertion level is high, and a barred signal that its assertion level is low.

Referring to FIG. 7, and input message having the format of FIG. 5A is fed to a shaper 88 which reforms the pulses and is then applied as steering inputs to FF89 which eliminates effects of noise. A source of 32KC pulses is used in the resynchronizer, as will be described, and the first of these pulses after the steering changes triggers FF89 to the corresponding state. Thus the signals at the 1-output designated SHAPER are those of the input message, but reformed and free of noise. A high level corresponds to a 1-bit and a low level to a 0-bit. The SHAPER signal is inverted to yield $\overline{\text{SERIAL INPUT}}$ and again inverted to form SERIAL INPUT. These provide steering inputs to the first stage 90 of the input register 65. The register contains 51 stages. If the sync pattern is satisfactory, SHIFT LIMIT (FIG. 11) at gate 91 will go low and allow $\overline{\text{ØA}}$ pulses to pass to the trigger inputs of all stages, thereby shifting the message information into the register. When 51 bits have been inserted, SHIFT LIMIT goes high to prevent further shifting. The outputs of the stages are designated IR1 to IR51, and the corresponding barred signals. IR1–20 give the SIC bits, IR21–27 the MC bits, IR28–39 the Price bits, and IR40–51 the Volume bits (not used).

FIG. 8*a* shows the Price Storage Register. IR28–31 represent the most significant digit and are applied individually to four FF stages in box 92. Only the first and last stages are shown in detail. IR28, $\overline{\text{IR28}}$ are steering inputs to stage 92', and IR31, $\overline{\text{IR31}}$ to stage 92''. IT (FIG. 11) is applied to the trigger inputs of all four stages, and when it occurs the stages assume states determined by the IR inputs. The 1-outputs yield QH $2^3$, $2^2$, $2^1$ and $2^0$ respectively, for the four bits of the most significant digit. The 0-outputs yield corresponding barred signals. Boxes 93 and 94 are similar to 92 and each has four stages. Box 93 receives IR32–35 and produces QM $2^3$–$2^0$ for the middle digit. Box 94 receives IR36–39 and produces QL $2^3$–$2^0$ for the least significant digit.

FIG. 8*b* is similar, but has seven FF stages for the seven bits of the message code. It receives IR21–27 and, upon occurrence of IT, the stages produce MC $2^6$–$2^0$ and corresponding barred signals.

FIG. 8*c* is also similar, but has 20 stages for the SIC bits. The first five receive IR1–5 and, when triggered by IT, produce SCR1–1 to 1–5, giving the five bits of the first SIC character. Succeeding groups of five are similarly triggered by IT to produce succeeding SIC characters as indicated. Provision is made to reset the first five stages of this register if an excessive time has elapsed after the last message. DR (FIG. 10) and $\overline{\text{OTC}}$ $\overline{\text{RESET}}$ (FIG. 14) are applied through OR 95 to a half-second detector 96. Upon initial application of one of these signals, the SCR RESET output is low and remains low if another signal is applied within a half-second as in normal operation. If not, detector 96 is arranged to cause SCR RESET to go high. This is inverted and applied to gate 97 along with $\overline{\text{ØA}}$ to reset the IR1–5 stages. SCR RESET is also applied to Shift Limit FF123 (FIG. 11) to avoid lockup if the FF is in the wrong state when power goes on.

FIG. 8*d* shows the commodity detectors. For a commodity the first SIC character is $C_1$ or $C_2$, depending on the source of the quotation. $C_3$ is not now used, but provision is made for its future use. IR1–5 (and barred) signals are supplied in proper combinations to decoder gates in 98 to yield $C_1$, $C_2$ or $C_3$ outputs. The codes are shown in parentheses. The outputs go to OR99 and are inverted to give C1+C2+C3.

FIG. 9 shows the Resynchronizer and Clock circuits. The outputs of a 32KC pulse generator 101 is supplied through inverters 102, 103 to a divide-by-32 counter 104. The outputs of the several stages of counter 104 are supplied to Sample Pulse Generator 105 where they are combined to yield different phase outputs ØA, ØB and ØC. The pulses in each phase occur at a 1KC rate. The 0-output of the last stage, $\overline{\text{TC2}^4}$, is also taken out. The clock is resynchronized at the leading edge of each 1-bit in the message. FF106 is steered toward its set state, and triggered by SHAPER pulses. When set, FF106 steers FF107 toward set, and the next $\overline{\text{32KC}}$ pulse from inverter 102 sets FF107 and the 1-output goes high to reset counter 104. The set FF107 steers FF108 toward set. The next 32KC pulse from inverter 103 sets FF108, the 1-output resets FF106, and FF107 is reset by the next pulse to its T input, thereby releasing the reset of counter 104. The counter starts counting from zero, and hence yields outputs properly phased with respect to the data bits.

FIG. 9*a* shows the phases. ØA occurs at one-half of a SHAPER bit interval, ØB occurs at one-fourth and ØC at three-fourths, corresponding to counts of 16, 8 and 24 respectively. The input register is shifted by ØA pulses, and hence bits will be inserted therein one-half a bit interval after the corresponding bits in the SHAPER signal, as indicated.

FIG. 10 shows the sync detector and SM counter circuits. A four-stage counter 111 is triggered by ØB pulses from gate 112. GM (FIG. 11) is initially low. SHAPER pulses to gate 113 are inverted and applied to the counter reset lines. Consequently 0-bits in the SHAPER signal will reset the counter, but 1'-bits will not. Accordingly, successive 1-bits will allow the counter to count 0B pulses. When nine have been counted, it is recognized by gate 114 and the gate output goes high to inhibit gate 112 and stop further counting. The high output of 114 also steers FF115 toward set, and it is set by the next 32KC pulse. The 1-output of FF115 goes high to inhibit gate 113 and prevent counter 111 from being reset. Thus nine or more 1-bits (sync of either FIG. 5A or 5B) will lock up counter 111.

The low 0-output of FF115 enables gate 116. When SHAPER goes low for the 0-bit in the sync pattern, gate 116 is opened and passes a $\overline{\text{ØB}}$ pulse which, by inversion, forms a high Sync pulse which sets Data Ready FF117. This produces high DR and low $\overline{\text{DR}}$ outputs. The high DR to gate 114 makes its output low, removing the inhibition on gate 112 and steering FF115 toward reset. The next 32KC pulse resets FF115 and the 1-output goes low to remove the inhibition on gate 113. Hence the sync detector is ready for another sync pattern when received.

Resetting of FF115 causes its 0-output to go high and inhibit gate 116, FF117 is reset by the next ∅C pulse and its 0-output goes high to set SM Reset FF118. In its normal reset state, the high 0-output of FF118 holds SM Counter 119 reset. This reset is removed by setting FF118, and counter 119 starts counting 0B pulses. The counter stage outputs are decoded (FIG. 11) to form $\overline{SM54}$ at a count of 54, and this is applied to gate 121. The next $\overline{∅C}$ pulse resets FF118 and its 0-output goes high to reset counter 119 and hold it there.

Referring to FIG. 11, the shift limit circuits will be described first, since this controls entry of the signal into the Input Register. A high DR (or high SCR RESET as previously mentioned) to OR122 gives a low output which is inverted and sets DC FF123 to produce a low SHIFT LIMIT signal. This enables gate 91 in FIG. 7, as already described, to shift a message into the input register. The SM signals to gate 124 decode the counts of 52, 53 and the output is inverted to form $\overline{SM52+53}$. This is applied to gate 125 along with $SM2^0$ to produce a high output at a count of 52 and reset FF123, thereby causing SHIFT LIMIT to go high and inhibit gate 91 to stop further shifting of the Input Register. The count of 52 is at ∅B time, ahead of ∅A which produces the shifting, so that 51 bits will be in the Input Register. The remaining two parity bits will not be entered, but will go the parity check circuits.

Describing the parity check, the $\overline{TC2^4}$ output of the sync counter (FIG. 9) is applied to FF126, connected as a toggle flip-flop which changes state at each trigger pulse. The outputs thus enable gates 127, 128 alternately. $\overline{\text{SERIAL INPUT}}$, applied to both gates, is low for 1-bits and high for 0-bits. Accordingly, 1-bits will allow ∅A pulses to trigger FF's 131, 132 alternately as FF126 toggles, so as to count separately the odd and even 1-bits in the message. These FF's have previously been reset by DR through gate 133. For correct (odd) parity, both FF's should end in a set condition, giving low 0-outputs. These are applied to gate 134.

As an added safeguard against an incorrect price, the price information in the Input Register is checked for BCD digits from 10 to 15, since only BCD 0 to 9 should be present. IR28–30, 32–34, and 36–38 are applied to gates in Detect 135 in proper combinations to recognize BCD 10–15, and the gate outputs combined and applied to gate 134 to inhibit it if one of these numbers is detected. With correct parity and no BCD 10–15, the output of gate 134 will go high, and is inverted and applied to gate 136.

As a further safeguard, the SIC portion of the Input Register is checked to make sure the first character position is not blank. IR1–5 are applied to OR137. If all inputs are low, there is no first character and the output of OR137 will be high to inhibit gate 136. If any input is high, the output of 137 will be low.

Outputs of SM counter 119 are applied to gate 138 to develop SM54 at a count of 54, and this is inverted to form $\overline{SM54}$. With the other inputs low, $\overline{SM54}$ sets GM FF141 to produce a high GM and low $\overline{GM}$ which steer FF142 toward set. $\overline{\text{OTC RESET}}$ at gate 143 is low if the output logic is not busy, and ∅A sets FF142 to yield a high IT and low IT. The latter is inverted and resets FF141. As above described, IT supplies the information in the Input Register to the storage registers of FIG. 8.

FIG. 12 shows the message counter which rejects the second of a pair of duplicate messages occurring before the first has been processed. Toggle FF145 and FF146 are rest by IT. The resultant high 0-output of FF145 inhibits gate 147. When a sync pattern of the next message is detected, $\overline{DR}$ to gate 148 goes low and a $\overline{0B}$ pulse sets FF145, yielding a low 0-output which enables gate 147. When $\overline{SM54}$ occurs at the end of the message, gate 147 passes a ∅A pulse and produces a high MC1 output. This resets GM FF141 in FIG. 11, thereby preventing FF142 from developing a high IT.

As long as FF141 is set, the high GM signal to gate 112 of FIG. 10 prevents the sync detector from looking for a new sync pattern. The reset of FF141 allows a new sync pattern to be recognized. After rejecting one message, the next $\overline{DR}$ resets FF145 and at the same time sets FF146. Resetting FF145 inhibits gate 147 so that MC1 cannot be developed. Setting FF146 produces a high 1-output which is fed back to inhibit gate 148 so that the next $\overline{DR}$ is not effective. When IT transfers the message from the input register, it resets FF145 and FF146 to their initial states. If a $\overline{DR}$ is then present, a new cycle of operation begins. Overall, when a first message is accepted, the second is rejected, and the third locked up in the input register until IT is developed.

FIG. 13 shows the message decoding. The MC. outputs of the storage register of FIG. 8*b* are supplied to decoder gates in block 151. Table 152 shows the coding combinations for the prices shown at the right. The gates in 151 and the inputs thereto are selected to recognize the various code combinations and yield respective outputs.

FIG. 14 shows the output transfer counter circuit. Counter 154 has eight stages and counts ∅B pulses. The 1-outputs and 0-outputs of the stages are brought out as indicated. Prior to the transfer of a message from the input register, FF155 is in its set state, and its high 1-output holds counter 154 in its reset condition. Upon transfer of a message, IT resets FF155, thereby releasing the reset to counter 154 and allowing counting to proceed. The various outputs of the counter are applied to gates in block 156 of FIG. 14*a* in combinations selected to yield the output count signals indicated. These count signals control the timing of the output transfer operations. To stop counter 154, an OT RESET signal from FIG. 16 is applied to FF155 to set it, thereby resetting counter 154 and holding it reset until a new IT is produced.

FIG. 15 shows the SIC Test and Useable Message Detector. For a message to be useable the corresponding SIC must be on either the Full Range or Last Sale boards, or on both. It must also contain a price category which is on the boards. The test is made at count OTC 12, which is applied as set steering inputs to FF157 and FF158. FF157 is reset by a previous 0A pulse and its 1-output to gate 159 is low. A 32KC pulse sets FF158 and gives a low 0-output to gate 159. The output of gate 159 goes high and is inverted to form a low SIC TEST. This signal remains low until the trailing edge of the next 0C pulse triggers FF157 to its set state, making its 1-output high to inhibit gate 159. The setting of FF157 gives a low F9 (Force nines) used in FIGS. 18 and 27. The next ∅A pulse resets FF157.

The low $\overline{\text{SIC TEST}}$ enables gate 161. If all the category inputs to OR162 are low, a useable category is not present and the high output of 162 is inverted and further enables gate 161. The next ∅C pulse then produces a high $\overline{\text{USEABLE MESSAGE}}$ signal indicating the message is not useable. If the output of OR162 is low, the message is considered useable insofar as price category is concerned.

The determination of SIC on the board will be described later. If not present on either board, both signals LTTN and LSTN will be high. These are inverted and applied to gates 163, 164 along with the low $\overline{\text{SIC TEST}}$, and the gate outputs will go high at ∅A to set FF165 and FF166. The respective outputs to gate 167 will be low and the MSG CODE output will go high. This will predominate over the low output of OR162 and produce a high output from gate 161. The setting of FF's 165, 166 will also produce high FRK and LSK signals used in the clear board detector of FIG. 16.

If the message SIC is on the board, one or the other of signals LTTN, LSTN will be low, leaving the corresponding FF reset and producing a low MSG CODE signal. This, with the low output of OR162, will make the output of gate 161 low, corresponding to a useable message. When $\overline{\text{OTC RESET}}$ gores low after a message has been transferred to the board (described later), it is inverted and resets FF165, FF166.

Referring to FIG. 16, $\overline{\text{USEABLE MESSAGE}}$ is applied to OR171 and the output inverted to yield OT RESET. If the latter is high at OTC12, corresponding to a nonuseable message, it will reset the OTC counter 154 in FIG. 14 and abort the transfer operation. FF172 will have been reset by a previous to RESET, yielding a low OT and high $\overline{OT}$, and if the message is useable it will remain reset at OTC 12. At a count of 15, the low $\overline{OTC15}$ to gate 173 will pass φA to set FF172, producing a high OT and low OT which enable the solenoids in the board modules, and also steering FF174 toward set. Gate 175, with the inputs shown, recognizes a count of 40 and φA sets FF174 to produce a high OTD and low $\overline{OTD}$ which enable the motors in the board modules. If no clear board condition exists at a count of 220, a compulsory reset is produced. Gate 176 recognizes the count and a φC pulse resets FF174, and produces a high OT RESET which resets FF172 and the OTC counter of FIG. 14.

The lower portion of FIG. 16 is the clear board detector. K signals from the full range board are applied to gate 178 and those from the last sale board to gate 179. As will be explained, one or more of these signals will be high if the corresponding solenoids in the board modules are energized. When all are deenergized, the solenoids have completed their positioning function and all K signals will be low, giving high outputs from the gates. These are inverted in OR181 and OR182, combined, and applied as a low input to gate 183. $\overline{OTD}$ is low whenever a module motor is operating. To insure that the motors are energized sufficiently long to reach the detent positions established by the solenoids, FF184 is set at a count of 41 recognized by gate 185 from the inputs shown, making line 186 high to inhibit gate 183. At a count of 92 recognized by gate 187, FF184 is reset, making line 186 low and completing the enabling of gate 183. The resultant high output is inverted and releases the reset to FF188, FF189. The following $OTC2^0$ pulse sets FF188 to provide set steering inputs to FF189, and the next pulse sets FF189. The resultant high 1-output to OR171 resets FF172, FF174 and OTC counter 154, thereby terminating the output transfer cycle. The delay provided by FF188, FF189 insures that a clear board condition will exist for a short interval before OTC reset, so that a momentary false clear signal will not be effective.

As described for FIG. 15, if the SIC of the message is not on either board, MSG CODE will be high and produce a high $\overline{USEABLE\ MESSAGE}$. In FIG. 16, this will immediately produce a high OT RESET which resets the counter of FIG. 14.

If the SIC is on one board but not on the other, K signals will not be produced for one of gates 178, 179. However, the corresponding FRK or LSK signal will go high. FRK and LSK are applied to OR181 and OR182, respectively. Assuming the SIC is on the full range board, FRK will be low but the output of gate 178 will go high when the null condition has been reached, making the output of OR181 low. The high LSK to OR182 will make its output low. Thus, when a null has been reached on the full range board, gate 183 will operate as above described.

FIG. 17 shows the manner in which message control signals are developed. A brief explanation of the operating procedure will facilitate understanding. After a day's transactions, say at midnight, Close signals are transmitted to given tens, units and fractions of the closing prices for the day, and Close Hundreds signals are transmitted separately to give the hundreds digit. The Close signals are also used to set Open, High and Low modules to blanks, and the Close Hundreds signals set the Last modules to blanks. This separation of blanking operations avoids excessive power requirements. At the beginning of the next day, Open prices for stocks are transmitted and entered in Open, High, Low and Last positions. Thereafter, during the day, only Last prices for stocks are transmitted, and New High (NH) and New Low (NL) prices are determined by a computer at the board location and entered in the corresponding positions. This local computation greatly decreases the number of messages required to be transmitted. Occasionally an Open price may be sent out incorrectly, and in such case an Open Correction message is transmitted which is entered in only the Open position.

For commodities, opening prices are sent out under a Bid message code, and subsequent prices under a Last message code. Commodities are likely to vary widely in price during the day and requires a more elaborate computer. Accordingly, Special High and Special Low messages are transmitted for commodities.

Referring now to FIG. 17, OR circuits 191 are supplied with the signals indicated, from the message decoder of FIG. 13. Their outputs are supplied to gates 192 which also have $\overline{OT}$ applied thereto so that they are effective only when an output is to be supplied to the board modules. The outputs of gates 192 are inverted to yield the signals indicated. As is apparent, an input CLOSE will produce output $\overline{CLOSE}$, $\overline{LOW}$, $\overline{HIGH}$ and $\overline{OPEN}$. An input CLOSE HUNDREDS will produce output $\overline{CLOSE\ HUNDREDS}$ and $\overline{LAST}$. An input LAST will produce an output $\overline{LAST}$. It is also inverted, without gating by $\overline{OT}$ to produce $\overline{LAST'}$. An input OPEN will produce output $\overline{OPEN}$, $\overline{LOW}$, $\overline{HIGH}$ and $\overline{LAST}$. An input OPEN CORR. will produce output $\overline{OPEN}$. An input BID will produce output $\overline{OPEN}$.

The input SPEC. HIGH and the computed NH produce $\overline{HIGH}$ and the input SPEC. LOW and computed NL produce $\overline{LOW}$. These signals are also inverted and supplied to gates 193, 193′ gates by $\overline{OTD}$ to light respective green and red lamps on the boards.

FIG. 18 shows the manner in which the signals from the price storage register of FIG. 8*a* are used to develop signals for the board control Dacon circuits. The high bits $QH2^0$–$2^3$ are double inverted to yield $CH2^0$–$2^3$ for the hundreds digits of a Close price. In case there is no hundreds digit, it is preferred to have the board show a blank rather than a zero. If all the QH bits are low, indicating a zero, the condition is recognized by gate 194 and a high inhibiting output applied to gates 195, 195′. The resultant CH outputs will be a BCD 10 (1010) which will set the corresponding board module to a blank position, as hereafter described.

The QH signals are also double inverted to form $T2^0$–$2^3$ for the tens digits of prices other than Close. Hundreds and tens are in separate messages so the QH signals can serve for both. Similarly, QM and QL inputs are double inverted to form respective U and F outputs for units and fractions.

For blanking the other price positions when CLOSE and CLOSE HUNDREDS occur, these signals are supplied to OR196, the output inverted, and used to inhibit gates 197, 197′ and 198, 198′, thereby yielding a BCD 10 in the T outputs. The inverted output of gate 196 is also connected to produce a BCD 10 for both the U and F outputs.

As will be explained later, for detecting SIC on the board the T outputs are forced to all zeros at an OTC count of 12. This is accomplished by a high OTC12+13 applied to the T output gates to give all low T outputs. Forcing nines is used in the High-Low computer at an OTC count of 13, and to this end a low $\overline{F9}$ is applied through inverters to force $T2^0$ and $2^3$ high, giving binary 1001 corresponding to BCD 9.

In the High-Low computer the signal M(0+1)T is used. This is obtained from gate 199 supplied with $QH2^1$–$2^3$. Signal M(8+9)T is also used, and is obtained from gate 200 supplied with the QH inputs shown, and also gates by $\overline{OTC13}$ and $\overline{φC}$.

FIG. 19 shows a Dacon input circuit, one of which is provided for each digit of each price position on the boards. The one illustrated uses CH signals from FIG. 18. $CH2^3$ has a high level (ground) for a 1-bit, and a low level (−6V) for a 0-bit. For a high level input, transistor Q1 will be cut off. Transistors with an arrow toward the base are PNP and NPN have an arrow away from the base. Current flowing through resistor 201, diodes 202 and resistor 203 will produce a voltage at point 204, and are selected so that under these conditions point 204 is at −18v. Q2 is connected as an emitter-follower, and the output voltage $A2^3$ will be −18v. Q3 will thus be cut off. For a low level input, the input diode 205 will block the signal, the base bias resistors of Q1 are selected so that Q1 conducts, and its collector will be at substantially ground, grounding point 206. Point 104 will now be somewhat positive to ground, causing Q3 to conduct and cutting off Q3. The current flowing through Q3 and diodes 202 makes the output $A2^3$ at ground potential. The other CH signals are applied to similar amplifiers to produce outputs A$2^2$, A$2^1$ and A$2^0$. The slider of potentiometer 207 is adjusted to give an A2 output of −18 volts. Slight adjustments of the potentiometer may be made to compensate for variations in the resistors and in voltage supplies.

The A outputs are supplied through respective resistors 208, 209, 210 and 211 to the output DN line. These resistors are graded, for example, 1, 2, 4, 8K as shown, and, together with the A2 resistor 212, convert the binary-coded amplifier outputs to an analog voltage in line DN. For a BCD-0, all amplifier outputs will be at ground. Thus resistors 208–211 will be in parallel from ground to the DN line. The A2 voltage will be voltage-divided to yield, with the values shown, a DN output of −1.125V. A BCD 10 will give a DN output of −12.375. The intermediate BCD digits will give intermediate output voltages, and their values correspond to those shown in FIG. 20.

To determine the presence of SIC on the board, the T outputs of FIG. 18 are forced to all 0-bits at OTC12+13. These go to the tens digit modules on the last sale board, and the tens modules of the last sale position of the full range board. For this test a DN output at ground level is desired. Accordingly, the A2 voltage of FIG. 19 is made zero.

To accomplish this, the input amplifiers of the last sale tens modules are modified as shown in FIG. 19*a*. Instead of obtaining A2 from a potentiometer, an additional amplifier 213, like that shown in FIG. 19, is employed. When $\overline{\text{SIC}}$ $\overline{\text{TEST}}$ is high, for normal operation, the A2 output of amplifier 213 is −18v. and the circuit functions the same as in FIG. 19. When $\overline{\text{SIC}}$ $\overline{\text{TEST}}$ goes low for the test, the A2 output of amplifier 213 is at ground level. The A$2^0$–$2^3$ inputs are all at ground level, giving a ground level DN.

FIG. 20 shows the arrangement of rotary switch 55 in the numeric submodule of FIG. 4. In practice, a shorting type switch is employed with the switch arm momentarily shorting adjacent contacts midway therebetween. The centers of the contacts are substantially aligned with the slots 51 of the detent wheel 49 of FIG. 4. The switch has 12 positions, with the top position connected to the switch arm 214. The displayed digit positions 0–9, and the blank position 10, are connected by the series resistors shown, and energized through resistors to ground and −18V to yield the negative voltages shown at each position. As above mentioned, the DN voltage of FIG. 19 has similar values for similar digits. Consequently, if the negative voltages match, the submodule is correctly set. Otherwise, the module motor operates until a match (null) is obtained. In order to decrease the overall time for changing a displayed digit, circuits are provided which drive the motor in the direction giving the shortest path to reach the new null position.

FIG. 21 shows a Dacon null detector, one of which is provided for each digit position of each price position on the board. The MN (displayed Module Number) input to Q4 is the switch arm output of FIG. 20. The DN (Desired Number) is from FIG. 19. MN is applied to emitter-follower Q4, producing −MN which is applied to emitter-follower Q5. Similarly, DN is applied to emitter-follower Q6, producing −DN which is applied to emitter-follower Q7. The emitter of Q5 is connected through line 216 to the base of Q8 and emitter of Q9. The emitter of Q7 is connected through line 217 to the emitter of Q8 and base of Q9.

Assume first that MN is more negative than DN, say −10.1v. for a displayed 8 and −5.6V for a desired 4. Line 216 will tend to be more negative than line 217, thereby cutting off Q8 and turning on Q9. With Q9 on, the collector voltage in line 218 (N1) will be negative. The negative excursion is limited to substantially −0.5 volts by diode 221. With Q8 cut off, the collector output in line 219 (N3) will be positive, and the positive excursion will be limited to substantially +0.5v. by the base-emitter path of Q11. If MN is less negative than DN, Q8 will be on and Q9 off. N1 will now be positive and limited to +0.5v. by the base-emitter path of Q10. N3 will be negative and limited to −0.5v. by diode 222.

With N1 negative, Q10 will be cut off. Resistors 223, 224 and 225 are selected so that under these conditions the base of Q12 is positive to ground. Hence Q12 conducts to give an SAA output of approximately 0 volts. Q13 will also be cut off, giving an N2 output of −6V from the source connected to diode 226. If the opposite conditions of MN and DN exist to make N1 positive, Q10 will be on, bringing its collector close to ground. This will cut off Q12, causing SAA to go positive. Resistors 227 and 228 are predetermined to make the magnitude of SAA slightly greater than one-half the range of analog voltages, say +6.3v. With Q10 on, Q13 will be turned on to give an N2 output of substantially 0 volt.

For the first condition with MN negative to DN, N3 will be positive, turning on Q11. Q14 will be turned on, giving an N4 output of substantially 0 volt. Q15 will be off, giving a negative SAB output, selected to be slightly greater than one-half the range of analog voltages, specifically −6.3v. For the opposite conditions of MN and DN, Q11 will be off, Q14 off the yield an N4 of −6v. and Q15 on to make SAB substantially 0 volts.

If MN and DN are at the same negative potential, both Q8 and Q9 will be cut off, yielding positive N2 and N3 outputs. Thus, both N2 and N4 will be at substantially 0 volt, SAA will be +6.3v. and SAB at −6.3v.

The above relationships are summarized in the table of FIG. 23.

FIG. 22 shows the Dacon direction detector which determines which way the numeric submodule motor should turn to reach a new position by the shortest path. Signals SAA, SAB and −DN developed in FIG. 21 are applied to equal resistors 231. Although the MN signal and a resistor of the same value could be used, in order to avoid using an amplifier having larger linear range than normally required, provision is made to apply +MN/2 through resistor 232 having half the value of the others. The resistors are connected to line 233 and to the base of transistor Q16 to form a summing amplifier.

The MN/2 signal is developed by applying −MN to Q17 having an amplification factor of one-half, thereby yielding a collector output of +MN/2. This is applied through emitter-follower Q18 to resistor 232. Q16 is a high-gain transistor with its emitter held slightly negative by diode 234. Hence it conducts when line 233 is positive, and is cut off when line 233 is substantially negative. The equations in FIG. 23 show the various conditions making line 233 positive or negative, the −6.3 being SAB and the +6.3 being SAA.

When Q16 conducts it collector is slightly negative and cuts off Q19. Resistors 235–237 and Zener diode 238 are selected so that under these conditions the base of Q20 is positive to cut off Q20. Consequently output DR2 is −6V. If Q16 is cut off, Q19 is on and Q20 is on, yielding a substantially zero DR2. Zener 238 and capacitor 239 provide a delay in changing DR2 from one value to the other, so that spurious noise pulses in input −MN will not produce momentary changes in DR2. The reason for making the magnitude of SAA and SAB slightly greater than one-half the range of analog voltages is to avoid an ambiguity in the direction of rotation when the displayed and desired digit positions are diametrically opposite.

As a specific example, with $MN$=−10.125 and $DN$=−5.625, FIG. 20 shows that the shortest path is down (counter-clockwise). From the above example and from FIG. 23, $N2$=−6.0,$N4$=0,$SAA$=0 and $SAB$=−6.3. Equation 1*b* applies, $DR2$=0, and the down direction will result.

FIG. 24 shows the manner in which $N2$, $N4$ and $DR2$ are used to control the solenoid and motor in a numeric submodule. One such circuit is provided for each digit of each price position, and that illustrated is for Close Tens. $N2$ and $N4$ are inverted to form $\overline{N2}$, $\overline{N4}$ and applied to gate 241. The output of 241 is applied to gate 242 along with CLOSE. The latter is low at an OTC count of 15 (OT time) if the message is a close price. If both $N2$ and $N4$ are high (0 volts,) no submodule change is required, and the output of gate 141 will be high to inhibit gate 242. If either $N2$ or $N4$ is low a change is required, the output of gate 241 will be low, and gate 242 supplies a high output to solenoid driver 243. This gives a driver output CTSC (Close Tens Solenoid Control). A high CTK is also produced. The driver is designed to provide a suitable voltage for operating the solenoids, say +17 volts.

The output of gate 241 and $\overline{CLOSE}$ are also applied to gate 244, along with $\overline{OTD}$ which goes low at an OTC count of 40. The resultant high output of 244 is supplied to OR245, and the low output of the latter in line 246 releases FF247. $\overline{CLOSE}$ and $\overline{OTC\ 41–92}$ to gate 248 and OR245 continues the release until a count of 92. *DR*2 is applied to gate 249, and inverted and applied to gate 250, along with OTC41–92. Gates 249, 250 are connected to opposite inputs of FF247. Accordingly, at a count of 40, FF247 will be set to one or the other of its states depending on whether *DR*2 is high or low. Gates 249, 250 are then inhibited during counts 41–92 so that the state of FF247 cannot be changed. The outputs of FF247 are supplied to motor driver 251 to produce driving signals of either polarity depending on the setting of the FF. Driver 251 may be two separate drivers, each operating when its input is at a high level, and arranged to give opposite polarity outputs. Whichever output is effective is amplified to form CTMC (Close Tens Motor Control). Signals of +14 and −14V are those actually employed. This causes the motor to run in the proper direction for the shortest path, as determined by *DR*2.

When the motor has driven the submodule to its proper digit, *N*2 and *N*4 both go high, thus inhibiting gate 242 and cutting off CTSC. This releases the solenoid of the submodule so that its detent arm 53 (FIG. 4) can drop into the next slot of detent wheel 49. CTK also goes low to indicate that a null has been reached. The high *N*2 and *N*4 will also inhibit gate 244 and cause release line 246 to go high and lock up FF247, provided an OTC count of 92 has been reached. Both outputs of FF247 will then go low, so that driver 251 will no longer yield an output of either polarity. The motor inertia causes it to coast until the detent becomes effective.

The circuit of FIG. 24 for other submodules, such as Close Units, High Fractions, etc. will receive signals *N*2, *N*4, *DR*2 corresponding to those submodules. For Close Units, signals CUK, CUSC and CUMC will be produced. For High Fractions, signals HFK, HFSC and HFMC will be produced, etc.

The Last Tens submodules on the Full Range and Last Sale boards are used for detecting SIC on the board, as above mentioned. These submodules have an additional output shown dotted in FIG. 24 and labeled LTTN, LSTN for Last Tens Null of the full range and last sale boards, respectively. Also, the HIGH and LOW Tens submodules have outputs at the same points for HIGH NULL and LOW NULL signals used in the High-Low computer. These signals are high when *N*2 and *N*4 go high, corresponding to the null condition.

FIG. 25 shows details of the board module control. That illustrated is for the Full Range board. Switches 45 are those of the alpha submodule of FIG. 3, and are set in the SIC combination for the stock to be displayed. SCR1–1 through 5, and barred signals, from FIG. 8*c* are applied to the switch contacts. Similar sets of switches for SCR2, 3, 4 are indicated by boxes. The arms of all the switches are connected to gate 255. The switch settings are arranged so that, when all inputs to gate 255 are low, the proper SIC is recognized. The resultant high output is amplified and energizes SIC relay 256 to close the ganged switches. The dotted box 257 shows the Close position. Solenoids 54 are those in the numeric submodules of FIG. 4 for the respective digits, and are connected to the solenoid control lines CHSC, etc. from the corresponding solenoid drivers 243 (FIG. 24). When switch 258 is closed, it grounds solenoids 54 through respective diodes so that the solenoids can be energized in accordance with the SC signals.

Rotary switches 55 are those of the numeric submodules, and are like that of FIG. 20. Closing of switch 259 applies −18V to the switches so that SW signals CHSW, etc. can be developed in accordance with the digit settings. Submodule motors 47 are grounded on one side by switch 261, and the other sides receive MC signals CHMC, etc. from the corresponding motor drivers (FIG. 24). Box 262 contains four arrangements like box 257, except that the hundreds digit and associated circuits are omitted. Switch 263 applies −12V to the Green and Red lamps in the High and Low positions, so that they can be lighted as described for FIG. 17.

It will thus be seen that one of the numeric submodules can be actuated until the SIC has been recognized. When it is, the numeric submodules are enabled for actuation as required to display new prices.

The last Sale board contains SIC recognition circuits like that shown, for each stock position, and solenoids, rotary switches and motors like the Last Sale position on the full range board.

The detection of SIC on the board can now be explained. If the SIC of the message corresponds to a stock setting on either the full Range or Last Sale boards, the corresponding SIC relay 256 will be energized. This supplies −18V for the rotary switches 55. From FIG. 20 it will be apparent that all rotary switch outputs will be at some negative potential to ground, since the switches do not stop at their top positions (no detent slot). Thus the SW output of the tens submodules in the Last Sale position will be negative. This in MN in FIG. 21. DN from FIG. 19*a* is at ground for the SIC test, in order that it will be less in magnitude than the lowest negative voltage corresponding to digit 1. This combination, from FIG. 23, gives a low *N*2. From FIG. 24, either LTTN or LSTN will therefore be low, depending on which board contains the matching SIC. Or, both may be low if the stock is on both boards. From FIG. 15, a low LTTN or LSTN allows a low $\overline{USEABLE}$ $\overline{MESSAGE}$ to be developed.

If the SIC is not on either board, SW will be at ground, for to DN, and both *N*2 and *N*4 will be high. This makes both LTTN and LSTN high, and the output of FIG. 15 will be high to indicate the message is not usable.

FIGS. 26A and 26B, placed together, show the overall arrangement of the controls of the board positions. The bottom row shows the Last Sale board, and the rows thereabove show the Full Range board. The first column of FIG. 26A shows input amplifier and digit/analog converter units like FIG. 19 for each digit of each price position, and the inputs from FIG. 18 supplied thereto. The second column shows null detector, summer and output amplifier units like those of FIGS. 21, 22 for each digit of each price position. The third column shows solenoid and motor control units like FIG. 24, also for each digit of each price position. In this column, lines 265 bear no legend because of insufficient space. Signals $\overline{HIGH}$, $\overline{LOW}$ and $\overline{LAST}$ are applied to respective units in the associated blocks. The outputs are collected and supplied to FIG. 26B.

The multiconductor cables at the left of FIG. 26B bear legends indicating the signals supplied therethrough. Three stock positions are shown for the null range board, and others are added as desired. SIC lines go in parallel to all stock positions, as do the SC and MC signals for each digit of each price category. Similarly the SW signals are collected in parallel for all stock positions of each digit of each price category. This is possible since the SIC coincidence determines the stock location where the SC and MC signals are usable, and where SW signals can be produced.

In the Last Sale board at the bottom, the SIC COINC and LAST SALE positions have been rearranged to correspond to the Full Range board arrangement, for ready understanding. The actual physical arrangement is shown in FIG. 2.

FIG. 27 shows the computer used to determine whether the price in a Last message is a new high or new low. The price in the incoming Last message is compared with the prices then present in the high and low positions on the board in accordance with the following Boolean equations:

$$NH=](MT>BHT+(MT=BHT)(MU>BHU)+(MT=BHT)(MU=BHU)(MF>BHF)]\cdot\overline{[(MT=8+9)(BHT=0)]}+(MT=0+1)(BHT=9)$$

$$NL=[(MT<BLT)+(MT=BLT)\quad MU<BLU)+(MT=BLT)(MU=BLU)(MF<BLF)]\cdot\overline{[(MT=0+1)(BLT=9)]}+(MT=8+9)(BLT=0)$$

where:

MT = Message Tens Digit

BHT = BOard High Tens Digit

BLT = Board Low Tens Digit

MU = Message Units Digit

BLF = Board Low Fractions Digit, etc.

The *NH* equation compares the message tens, units and fractions with the corresponding digits in the high position of the board. The *NL* equation makes a similar comparison for the low position on the board. A plus sign (+) is read as "or" and products indicated by brackets or parentheses are read as "and" in accordance with present conventions.

Considering first the *NH* equation, the terms within the first bracket compare relative magnitudes of the message and board digits, and suffice when there is no change in the hundreds digit. When there is a change in the hundreds digit, special arrangements are employed inasmuch as this digit is not displayed for High or Low prices. The first term within the bracket determines whether the message tens digit is higher than the board tens digit and, if so, as new high is indicated. If the tens are the same, the second term determines whether the message units are higher than the board units. If they are the same, the third term determines whether the message fractions are higher than the board fractions.

If the new message price is 99½ and the board price is 101½ the first bracket will give a wrong answer, since 9 is greater than 0 in the tens position. The second bracket takes care of a wrong answer. If the tens digit in the message is 8 or 9, and that of the board is 0, the result of the first bracket is inhibited.

If the message price is 101½ and the board price 99½, the first bracket will again give a wrong answer, but the second bracket will not inhibit it. The last term of the equation then applies. If the message tens is 0 or 1, and the board tens is 9, a new high signal will result.

The *NL* equation is similar. In the first bracket the first term specifies that if the message tens is less than the board tens, a new low is indicated, and similarly for units and fractions. The second bracket guards against the situation where the first bracket will give an erroneous result where a message price is 101½ and the board price is 99½. Similarly, the last term produces a new low when the message is 99½ and the board is 101½.

The circuits of FIG. 27 implement these equations. In order to use the Dacon circuits for determining whether the board tens digit is 0 or 9, the Dacon inputs are forced to the 0 and 9 conditions at different times, and the presence or absence of a null under each of these conditions is determined. These results are used in the second bracket and the last term of each equation, and are obtained at OTC 13ØB and 13ØC times, respectively. If the results are not controlling, the result of the first bracket is determined at OTC 14ØC time.

FOr determining a 9 in the tens digit of the High and Low positions, FIG. 18 shows that $\overline{F9}$ forces the T outputs to a BCD 9. This occurs at an OTC count of 12ØC to 13ØA (FIG. 15). The T outputs go to the Dacon circuits of the tens digits of all board modules, but only those positions containing the proper SIC can operate. If a 9 is then being displayed in either the High or Low positions, the corresponding HIGH NULL and LOW NULL signals (FIG. 24) will be high and are supplied to inverters 271, 272.

Signal M(0+1)T from FIG. 18 is high for a 0 or 1 in the hundreds digit of the message, and is applied through inverter 273 to gate 274, along with the output of inverter 271. With a message 0 or 1 and a 9 from the board, gate 274 will give a high output at 13ØB time, which is inverted and supplied to gate 275. Gate 275 is enabled by $\overline{LAST}'$ and $\overline{F9}$, and the output will go high to set FF276. This delivers a low signal to gate 277 which yields a high NH output. This corresponds to the last term in the NH equation. A high NHFF signal is also produced.

$\overline{LAST}'$ from FIG. 17 is used for gate 275 and the gates thereabove, rather than $\overline{LAST}$, since the latter is gated by $\overline{to}$ which occurs at a count of 15, too late for the computer.

The outputs of inverters 272, 273 are supplied to gate 278 along with $\overline{F9}$. If a 9 is on the board and the message is 0 or 1, the output of gate 278 will go high. This is inverted, gated by ØB in 279, and sets NL Inhibit FF281. Line 282 goes high to inhibit NL-gate 283. This satisfies the second bracket in the NL equation.

At time 13ØC the T outputs of FIG. 18 will be all 0-bits. If the tens digit is 0 at either the High or Low board positions, the respective HIGH NULL and LOW NULL signals will be high. Signal M (8+9) T from FIG. 18 will be high for a message 8 or 9 at this time, and is supplied to inverter 284. The outputs of inverters 272, 284 are supplied to gate 285, and its output goes high for a message 8 or 9 and a 0 in the Low position. This inverted and supplied to gate 286 along with $\overline{LAST}'$, and the high output of 286 sets FF286 and delivers a low input to gate 283, producing a high *NL*. This satisfies the last term in the *NL* equation. FF287 also produces a high NLFF signal.

Also at time 13ØC, the outputs of inverters 271 and 284 to gate 288 will be low for a message 8 or 9 and a board 0. The resultant high output of 288 sets *NH*-Inhibit FF289, making line 291 high to inhibit NH-gate 277. This satisfies the second bracket in the NH equation.

Considering now the first bracket of the equations, inverted N2 and N4 signals (FIG. 21) of the High and Low Dacon circuits for tens, units and fractions are brought out and supplied to gates and OR circuits at the top of FIG. 27 as shown. This determination is made at time 140C. If an *NL* or *NH* signal has already been developed by the last term of either equation, either NHFF or NLFF will be high. In such case, the first bracket does not apply. The signals are applied to OR292 and the output inverted to inhibit gate 293. Otherwise $\overline{OTC14}$ and $\overline{ØC}$ produces a high gate output which is inverted to form $\overline{14ØC}$ and enables gates 293, 294.

If either FF281 or FF289 has been set in accordance with the second bracket of the *NL* or *NH* equations, the respective *NL*-gate 283 or *NH*-gate 277 will be inhibited so that the result of the first bracket will be ineffective. Otherwise, the following will apply.

If $\overline{HTN4}$ to OR295 is high, the corresponding N4 is low, and the table of FIG. 23 shows that MN is less than DN. This means that the desired message tens digit is greater than he board module tens digit. Accordingly, OR295 enables gate 293 and its high output sets FF276 to produce a high *NH*. If $\overline{HTN4}$ is low, the preceding gate applies. If $\overline{HTN2}$ to gate 296 is high, the message tens digit is less than the board's, and the gate is inhibited. If low, the tens digits are equal and the gate enabled. (The table of FIG. 23 shows that a high N2 and a low $\overline{N2}$ also corresponds to a message digit greater than a board digit, but this has been excluded if $\overline{N4}$ is low and N4 high.) $\overline{HUN4}$ is high if the message units digit is greater than the board's, and the resultant low output of OR297 passes through gate 296, OR295, etc. to produce a high NH. If $\overline{HUN4}$ is low, the preceding gate applies. $\overline{HUN2}$ to gate 298 is high if the message units digit is less than the board's and inhibits the gate. If low, the units digits are equal and gate 298 enabled. If HFN4 is low, corresponding to a message fractions greater than the board's, the output of gate 298 goes high and produces a high *NH*. Accordingly, the first bracket of the NH equation has been implemented.

The implementing of the first bracket of the *NL* equation is similar, except that the N2 and N4 signals are interchanged since a low N2 corresponds to a message digit less than the board digit. A high $\overline{LTN2}$ to OR301 gives a low output to gate 294, the resultant high to FF287 sets it, and the low to gate 283 gives a high *NL*. The operation of the remaining gates for developing a new low will be understood from the above description of the new high circuit.

If a commodity is being received, the computer is not used. C1 +C2 +C3 from FIG. **8*d* steers FF307 toward set, and the trailing edge of $\overline{IT}$ triggers it to yield a high 1-output which inhibits NL-gate 283 and NH-gate 277**.

The foregoing has been described specifically for the message format of FIG. **5*a*. For that of FIG. 5*b*, the input register of FIG. 7 may be shortened to 39 states and the SM counter of FIG. 10** changed to stop shifting into the input register at 40 rather than 52, and to produce $\overline{SM42}$ rather than $\overline{SM54}$.

The invention has been described in connection with a specific embodiment containing a large number of features promoting rapid updating, reliability and economy. It will be understood that some features may be employed and other omitted within the spirit and scope of the invention as defined in the claims. Also, many modifications in the detailed circuits may be made as desired.

We claim:

1. Apparatus adapted to control the extent and direction of rotation of a single reversible electric motor which in turn rotates an endless belt having a set of spaced apart digits *a... n* thereon, the set containing *n* different integers arranged in an ordered sequence, to index any selected first digit at a display station and thereafter to index a second digit to said station, said apparatus minimizing the time required to rotate the belt to index the second digit for display by rotating the belt in one direction or another to minimize belt movement, said apparatus comprising:

first means to produce a first unidirectional voltage of given polarity and having any one of *n* different discrete values, each value representing a different digit, said first voltage designating said first digit;

second means to produce a second unidirectional voltage of like polarity and having any one of *n* different discrete values, each value representing a different digit, said second voltage designating said second digit;

third means for comparing the first and second voltages to produce a control voltage having a first fixed null value when the first and second voltages are equal, said control voltage having a range or values differing from the null value and dependent upon the difference between the first and second voltages when the first and second voltages are unequal;

fourth means responsive to said control voltage and coupled to said motor to cause the motor to rotate in one direction to a position at which the second digit is indexed when the first and second voltages are unequal and the value of the control voltage exceeds that of a fixed reference voltage and to cause said motor to rotate in the opposite direction to a position at which the second digit is indexed when the first and second voltages are unequal and the value of the control voltage falls below that of said reference voltage, said motor remaining in fixed position without rotation when the first and second voltages are equal.

2. Apparatus as set froth in claim 1 wherein said set consists of digits zero through nine inclusive.

3. Apparatus as set forth in claim 2 wherein each of the first and second voltages attains any one of ten discrete values, the values changing in equal increments as the digits represented thereby change in integral increments.